US011199912B2

(12) United States Patent
Schliemann et al.

(10) Patent No.: US 11,199,912 B2
(45) Date of Patent: Dec. 14, 2021

(54) MULTI-MODAL HAND LOCATION AND ORIENTATION FOR AVATAR MOVEMENT

(71) Applicant: Magic Leap, Inc., Plantation, FL (US)

(72) Inventors: Federico Schliemann, Redmond, WA (US); Francisco Lopez-Fresquet, Los Gatos, CA (US); Victor Ng-Thow-Hing, Los Altos, CA (US); Tomislav Pejsa, Sunnyvale, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/692,751

(22) Filed: Nov. 22, 2019

(65) Prior Publication Data
US 2020/0174584 A1 Jun. 4, 2020

Related U.S. Application Data

(60) Provisional application No. 62/774,076, filed on Nov. 30, 2018.

(51) Int. Cl.
G06F 3/0346 (2013.01)
G06F 3/01 (2006.01)
G06T 13/40 (2011.01)
G06K 9/00 (2006.01)

(52) U.S. Cl.
CPC ............ *G06F 3/0346* (2013.01); *G06F 3/012* (2013.01); *G06T 13/40* (2013.01)

(58) Field of Classification Search
CPC ........ G06F 3/0346; G06F 3/012; G06F 3/017; G06F 3/013; G06F 3/011; G06T 13/40
See application file for complete search history.

(56) References Cited

U.S. PATENT DOCUMENTS

| 6,850,221 | B1 | 2/2005 | Tickle |
| 9,081,426 | B2 | 7/2015 | Armstrong |
| 9,215,293 | B2 | 12/2015 | Miller |
| 9,348,143 | B2 | 5/2016 | Gao et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,578,493 | B1 * | 2/2017 | Forsblom ................. G01D 3/08 |
| 9,671,566 | B2 | 6/2017 | Abovitz et al. |

(Continued)

FOREIGN PATENT DOCUMENTS

WO  WO 2020/112561  6/2020

OTHER PUBLICATIONS

International Search Report and Written Opinion for PCT Application No. PCT/US2019/062848, dated Mar. 25, 2020.

(Continued)

*Primary Examiner* — Bryan Earles
(74) *Attorney, Agent, or Firm* — Knobbe, Martens, Olson & Bear, LLP

(57) ABSTRACT

Examples of systems and methods for improved hand tracking of a user in a mixed reality environment are disclosed. The systems and methods may be configured to estimate the hand pose and shape of a user's hands for applications such as animating a hand on a user's avatar. Data from multiple sources, such as a totem internal measurement unit ("IMU"), external totem location tracking, vision cameras, and depth sensors, may be manipulated using a set of rules that are based on historical data, ergonomics data, and motion data.

20 Claims, 19 Drawing Sheets

(56) References Cited

U.S. PATENT DOCUMENTS

| | | |
|---|---|---|
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 9,971,490 B2 * | 5/2018 | Chen ............... G06F 3/017 |
| 2006/0028436 A1 | 2/2006 | Armstrong |
| 2007/0081123 A1 | 4/2007 | Lewis |
| 2012/0127062 A1 | 5/2012 | Bar-Zeev et al. |
| 2012/0162549 A1 | 6/2012 | Gao et al. |
| 2012/0280900 A1 * | 11/2012 | Wang ............... G06F 3/017 345/156 |
| 2013/0082922 A1 | 4/2013 | Miller |
| 2013/0117377 A1 | 5/2013 | Miller |
| 2013/0125027 A1 | 5/2013 | Abovitz |
| 2013/0159350 A1 * | 6/2013 | Sankar ............... G06F 3/038 707/784 |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0084866 A1 | 3/2015 | Thomas et al. |
| 2015/0100593 A1 * | 4/2015 | Underkoffler ...... G06K 9/00973 707/755 |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0261373 A1 | 9/2015 | Smus |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2017/0358139 A1 * | 12/2017 | Balan ............... G06F 3/0346 |
| 2018/0307303 A1 | 10/2018 | Powderly |
| 2019/0236344 A1 * | 8/2019 | Chen ............... G06F 3/0346 |

OTHER PUBLICATIONS

ARToolKit: https://web.archive.org/web/20051013062315/http://www.hiti.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

International Preliminary Report on Patentability for PCT Application No. PCT/US2019/062848, dated May 25, 2021.

* cited by examiner

MULTI-MODAL HAND LOCATION AND ORIENTATION FOR AVATAR MOVEMENT

INCORPORATION BY REFERENCE TO ANY PRIORITY APPLICATION

This application claims priority to U.S. Provisional Patent Application 62/774,076, filed Nov. 30, 2018, and entitled "MULTI-MODAL HAND LOCATION AND ORIENTATION FOR AVATAR MOVEMENT." The foregoing application(s), and other application(s) for which a foreign or domestic priority claim is identified in the Application Data Sheet as filed with the present application, are hereby incorporated by reference under 37 CFR 1.57.

FIELD

The present disclosure relates to virtual reality and augmented reality imaging and visualization systems and more particularly to dynamically adjusting and rendering virtual avatars based on contextual information.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Various examples of a mixed reality system (also referred to herein as a "wearable system") for determining an active hand, active hand orientation, active hand location, and/or an associated confidence level, based on a set of rules. The rules may be based on historical data, motion data, and ergonomic data. Two or more sensors may provide data, which may then be assigned an initial weight estimate. The multiple sensor streams may then be combined into a single estimate, which may be output and fed into an avatar rendering system.

Figure 1:
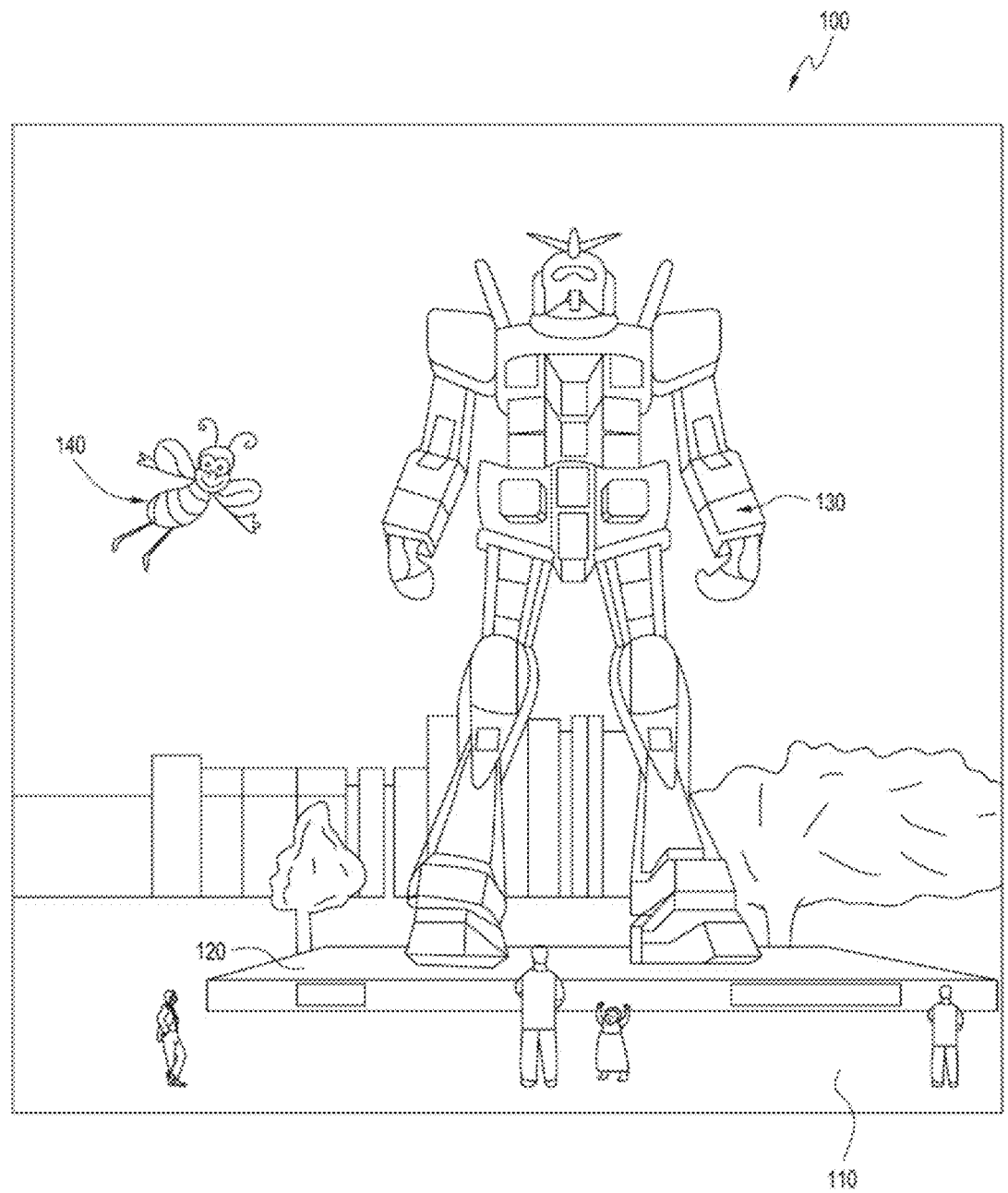
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual avatar may be a virtual representation of a real or fictional person (or creature or personified object) in an AR/VR/MR environment. For example, during a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive other students' or teachers' avatars in a virtual classroom and can interact with the avatars of the other students or the teacher.

When utilizing a virtual avatar to represent the user, it may be desirable to animate the avatar in a way that mimics the user's movements. For example, when the user moves her head, the avatar may make the same movement. In another example, when the user moves her hands and/or arms, the avatar may make the same hand and/or arm movement. Matching the user's movement may create a more realistic and accurate AR avatar experience for the user (and others that are interacting with the user). Traditional systems may not animate an avatar's hand movements at all, may animate the user's hand based on user input (instead of sensor data), or may animate the avatar's hand using one data source, such as the data from an IMU within a totem (or other handheld controller) being held by the user's hand. Although these traditional methods animate an avatar's hand, the methods are prone to error. For example, IMUs may be subject to drift over time, resulting in inaccurate location and/or movement of the user's hand. In another example, vision algorithms may be used to identify a user's hand, but these methods are limited to hand movement within the FOV of the camera and does not take the user's hand orientation into consideration. Additionally, even if traditional methods animate an avatar based on the user's movement, the traditional methods are unable to identify which hand is making the movement (e.g. right vs. left hand) nor can traditional systems determine the orientation of the user's hand that is making the movement. Hereinafter, the hand making the movement may be referred to as the active hand. In some embodiments, there is only one active hand. In some embodiments, there may be a first active hand and a second active hand.

Advantageously, in some embodiments, the wearable systems and methods described herein can automatically determine which hand is the active hand and the orientation of the active hand. This may be accomplished by combining two or more different modalities of sensed information about the hand(s) to produce a more robust and/or more accurate estimate of hand location and orientation of a user than a single modality could produce. The wearable system herein may be able to provide the following benefits: seamlessly track the hand beyond the FOV of gesture sensing, increase confidence in hand tracking when the hand is close to the border of the FOV (where confidence levels using gesture decrease), and by looking for collaborating evidence from the controller, for example, improve confidence of hand position using the improved combined estimate.

In some embodiments, the wearable systems and methods described herein may use two or more sensor data sources, ergonomic data, and motion data to increase the confidence level and accuracy of determining which user's hand (e.g. left, right) is moving and/or the orientation of that hand, for animation of a virtual avatar of the user. Confidence levels may be between a value of 0-100, and may be broken down into human readable categories of low confidence being 0-30%, medium confidence of 30-70%, and high confidence being above 70%. Other suitable ways of valuing confidence levels and/or dividing into categories may be used. For example, a threshold may be used to distinguish acceptable vs. unacceptable confidence levels.

In some embodiments, the wearable systems and methods described herein may estimate the hand pose and shape of a user's hands for applications such as animating a corresponding hand on an avatar representing the user. In some implementations, a wearable system may combine and evaluate the information from multiple different sources, such as 6DOF external active tracking of a hand-held controller(s), 6DOF internal motion sensors of a hand-held controller(s), and/or external passive tracking of the hands and/or controller(s) (e.g. totem), for example using a vision sensor, depth sensor, LIDAR sensor, etc. The information sources may be used to both estimate which hand is holding the control(s) and to improve the accuracy of hand-tracking pose and hand shape.

Accordingly, embodiments of the disclosed systems and methods may provide for a much more realistic and accurate animation of an avatar corresponding to the user.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment (or "MR system"), alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
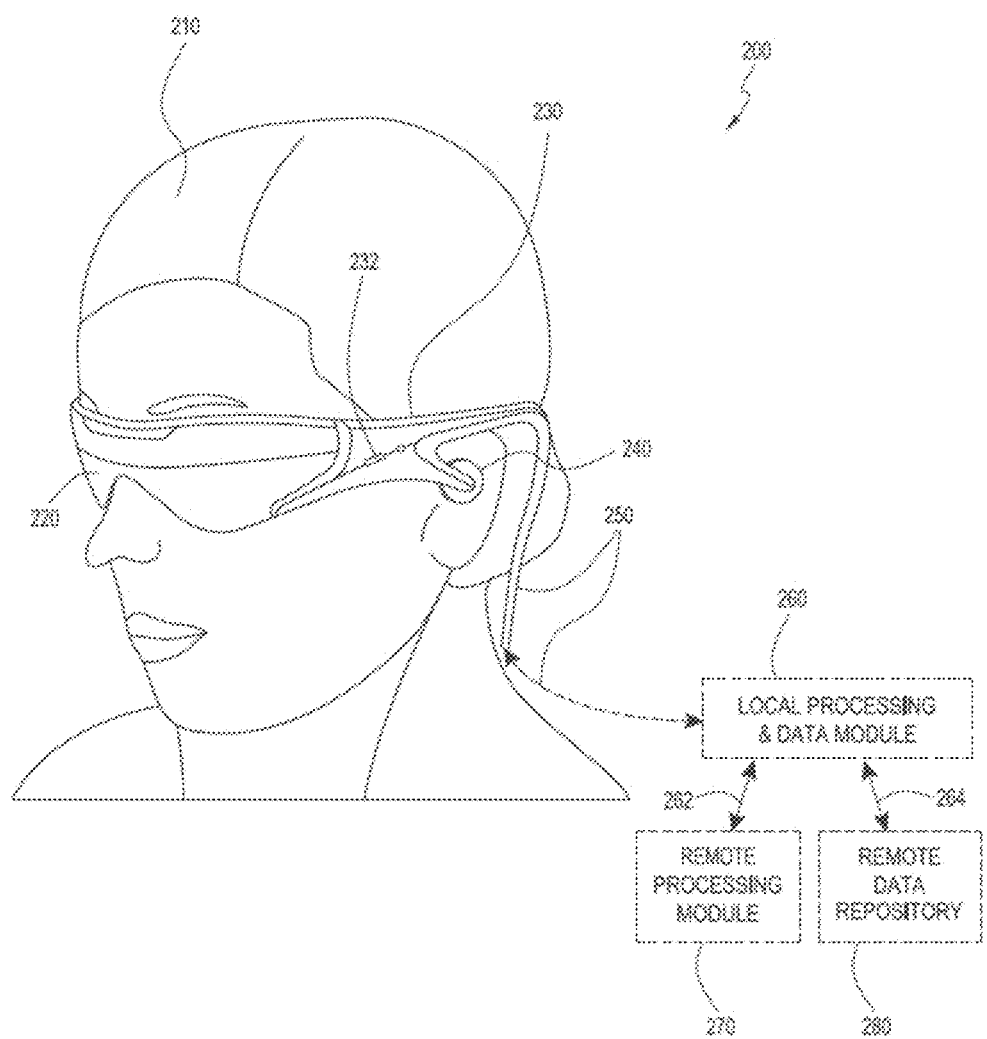
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements, or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 270 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of a Wearable System

Figure 3:
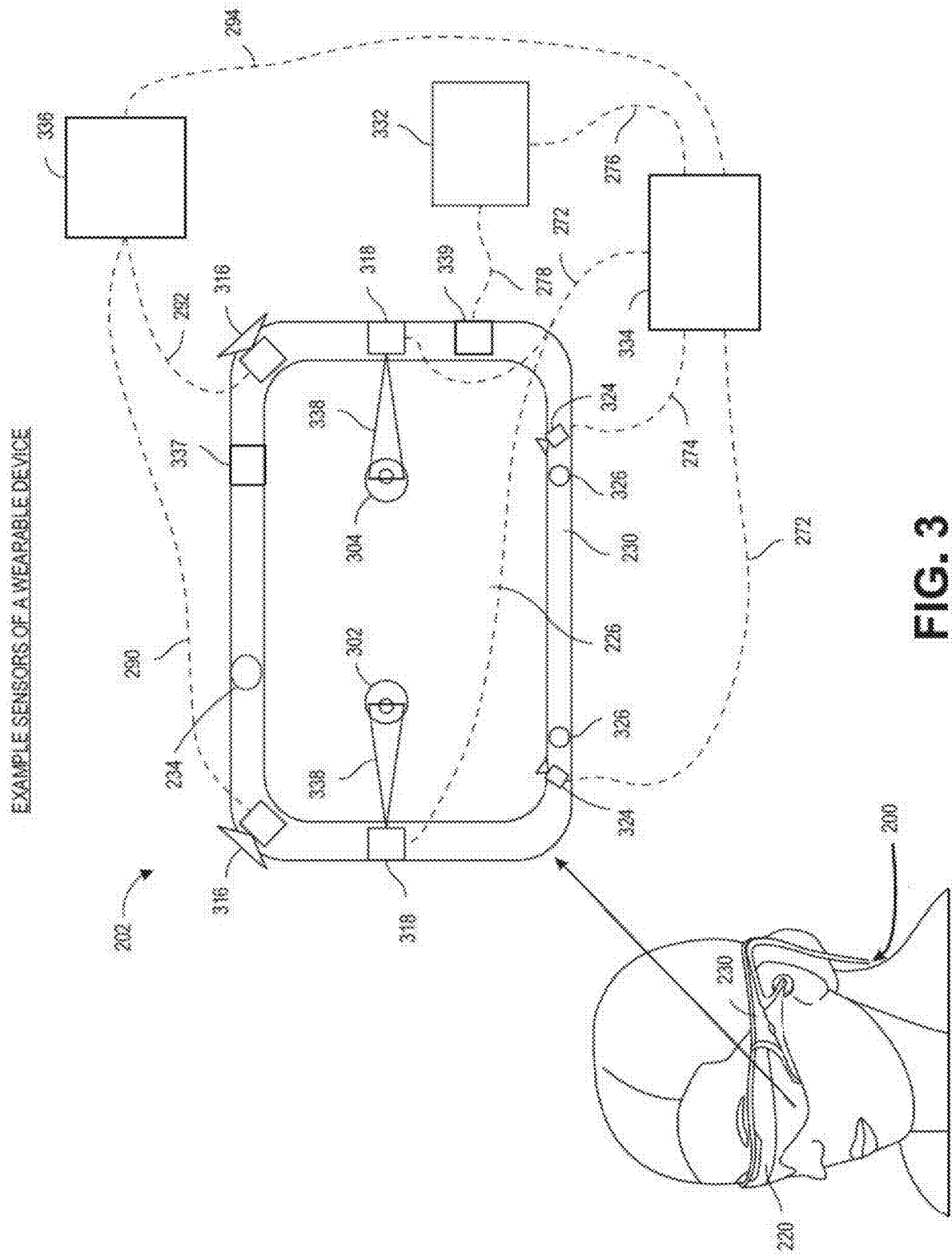
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two (e.g. wide-field-of-view machine) vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment. In some embodiments, there may be four world cameras 316. One or more of the world cameras 316 may be gray scale. One or more of the world cameras may be color. In some embodiments, two world cameras may be inwardly facing (e.g. cameras are angled towards each other but still facing out towards the world, away from the user), and two world cameras may be outwardly facing (e.g. angled away from each other).

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4. The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 3. The depicted wearable system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the cameras 316 (and/or other input devices). The head pose processor 336 can be a hardware processor and can be implemented as part of the local processing and data module 260 shown in FIG. 3.

The wearable system can also include one or more depth sensors 234. The depth sensor 234 can be configured to measure the distance between an object in an environment to a wearable device. The depth sensor 234 may include a laser scanner (e.g., a LIDAR), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.), which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers (which may be part of the sensor assembly 339 in the example of FIG. 3) may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a belt pack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the display system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
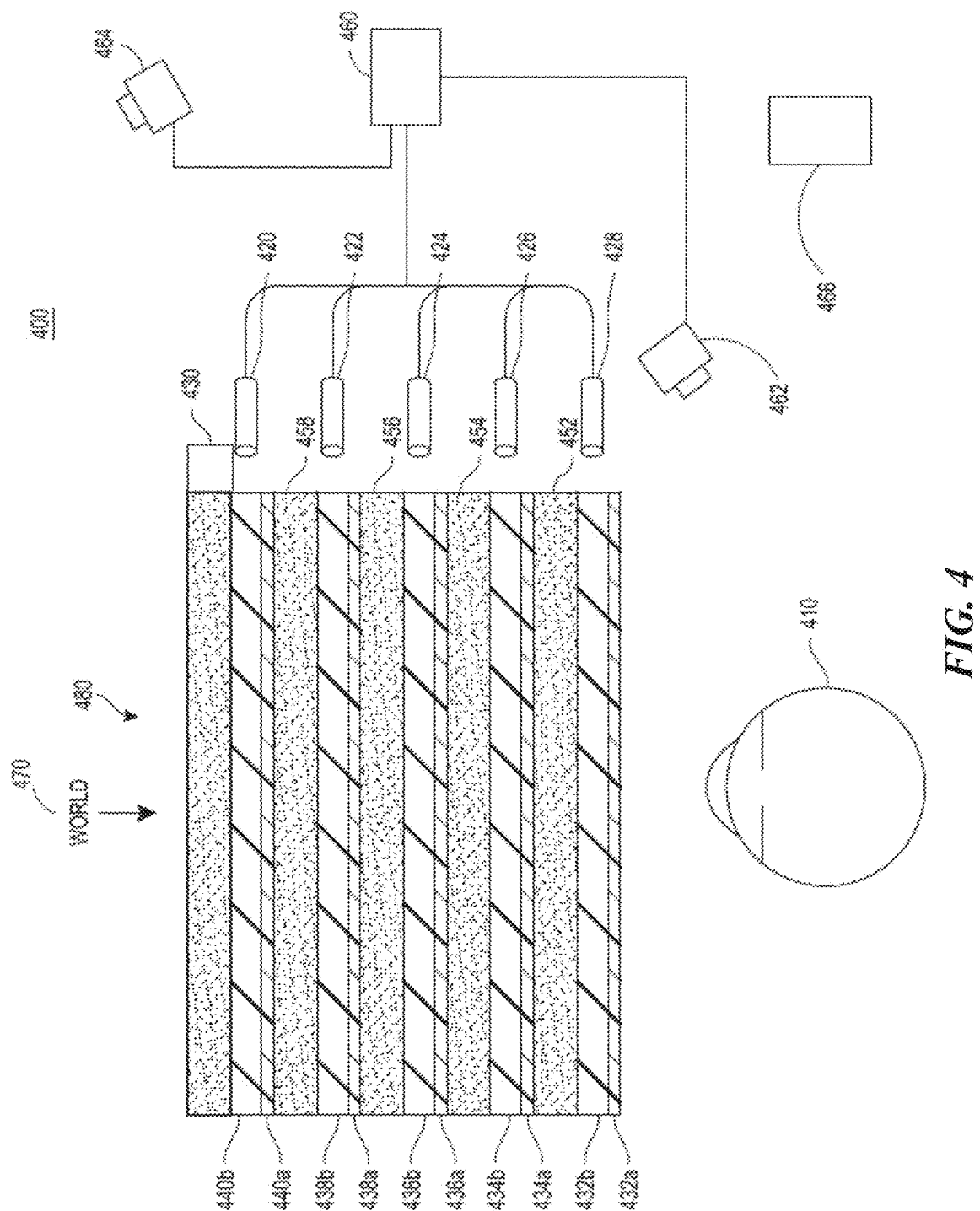
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature, so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4_{\pi}$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 232 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using a pose sensor, e.g., sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum, which can serve as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
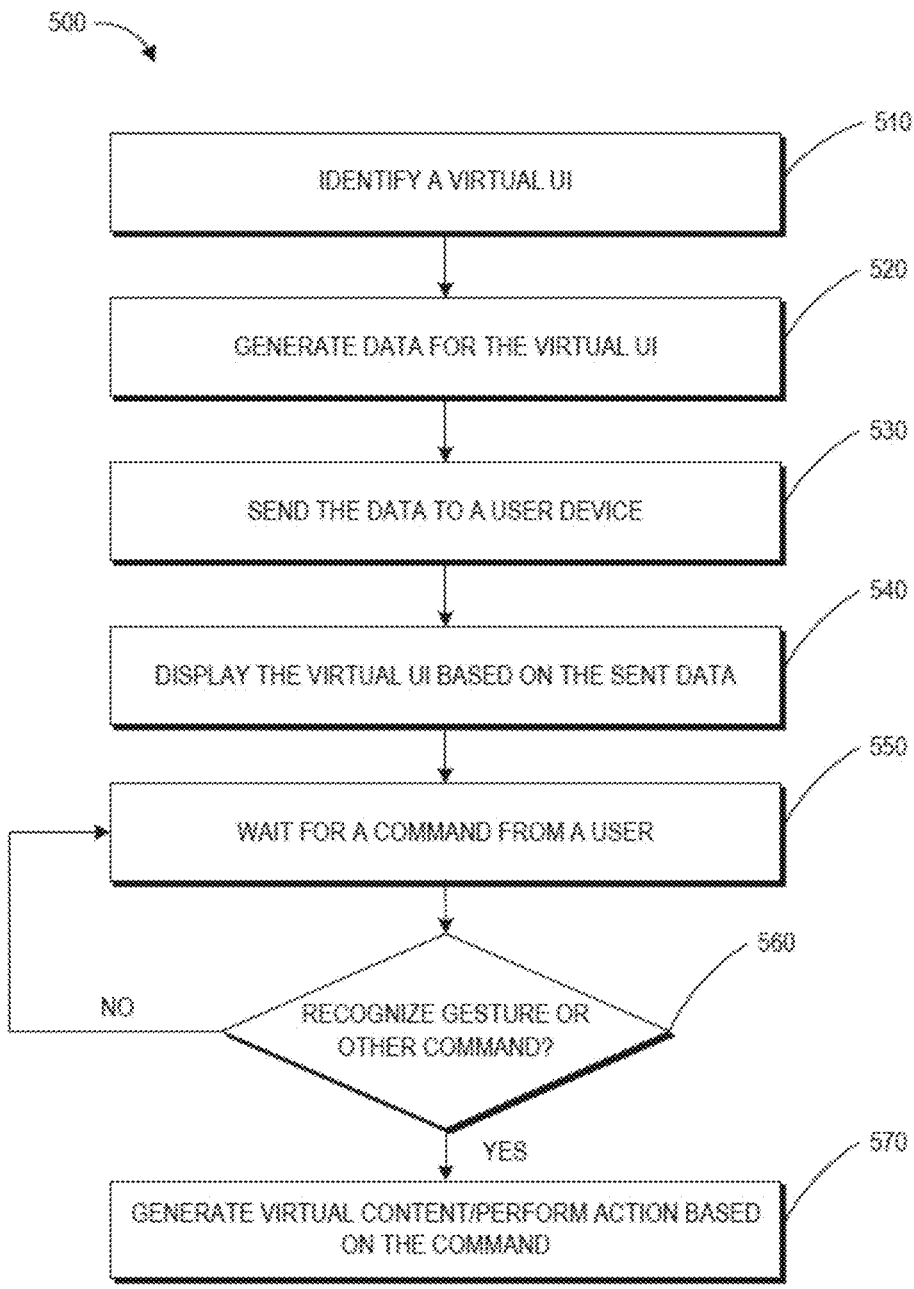
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
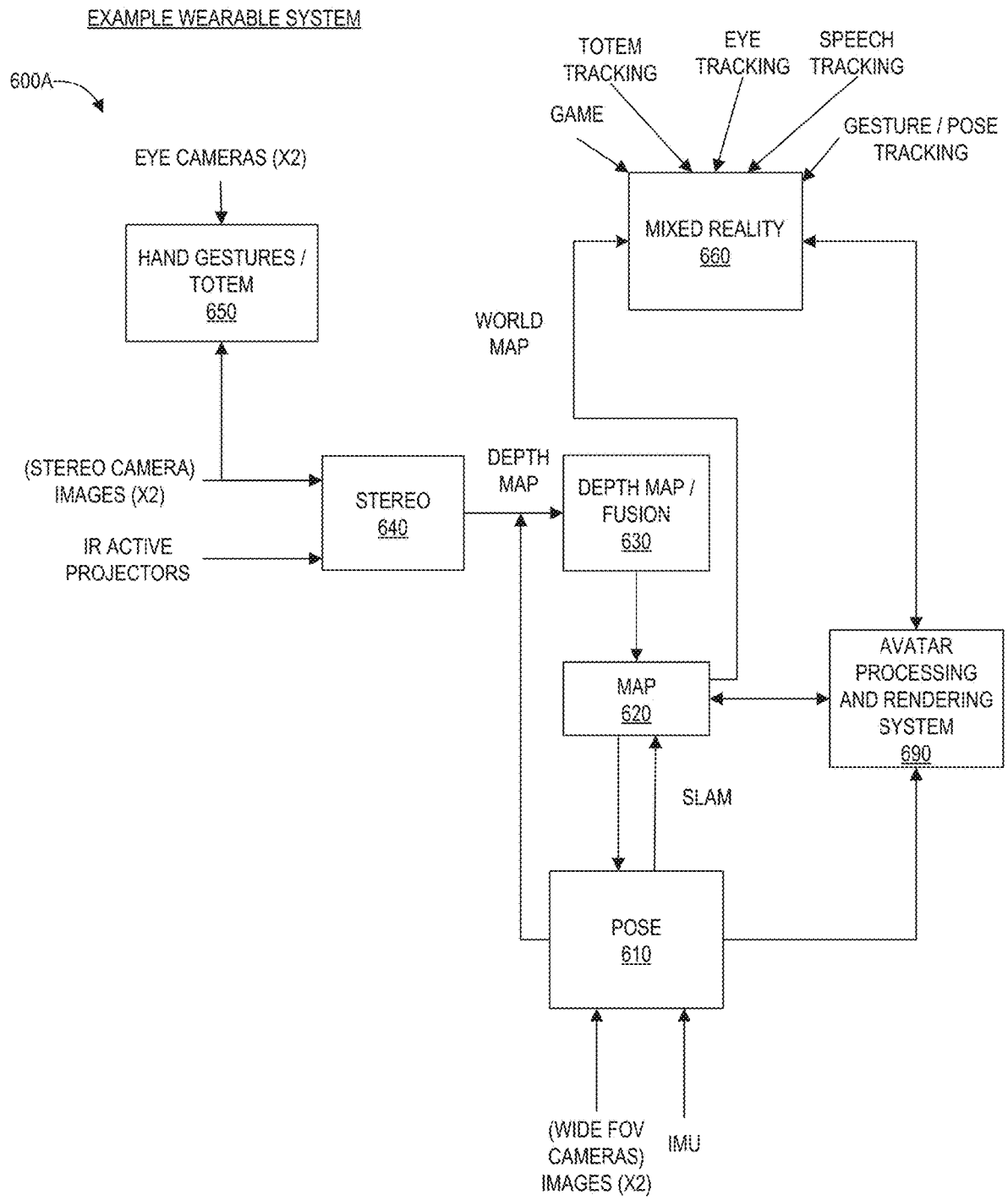
FIG. 6A is a block diagram of an example wearable system.
Figure 6B:
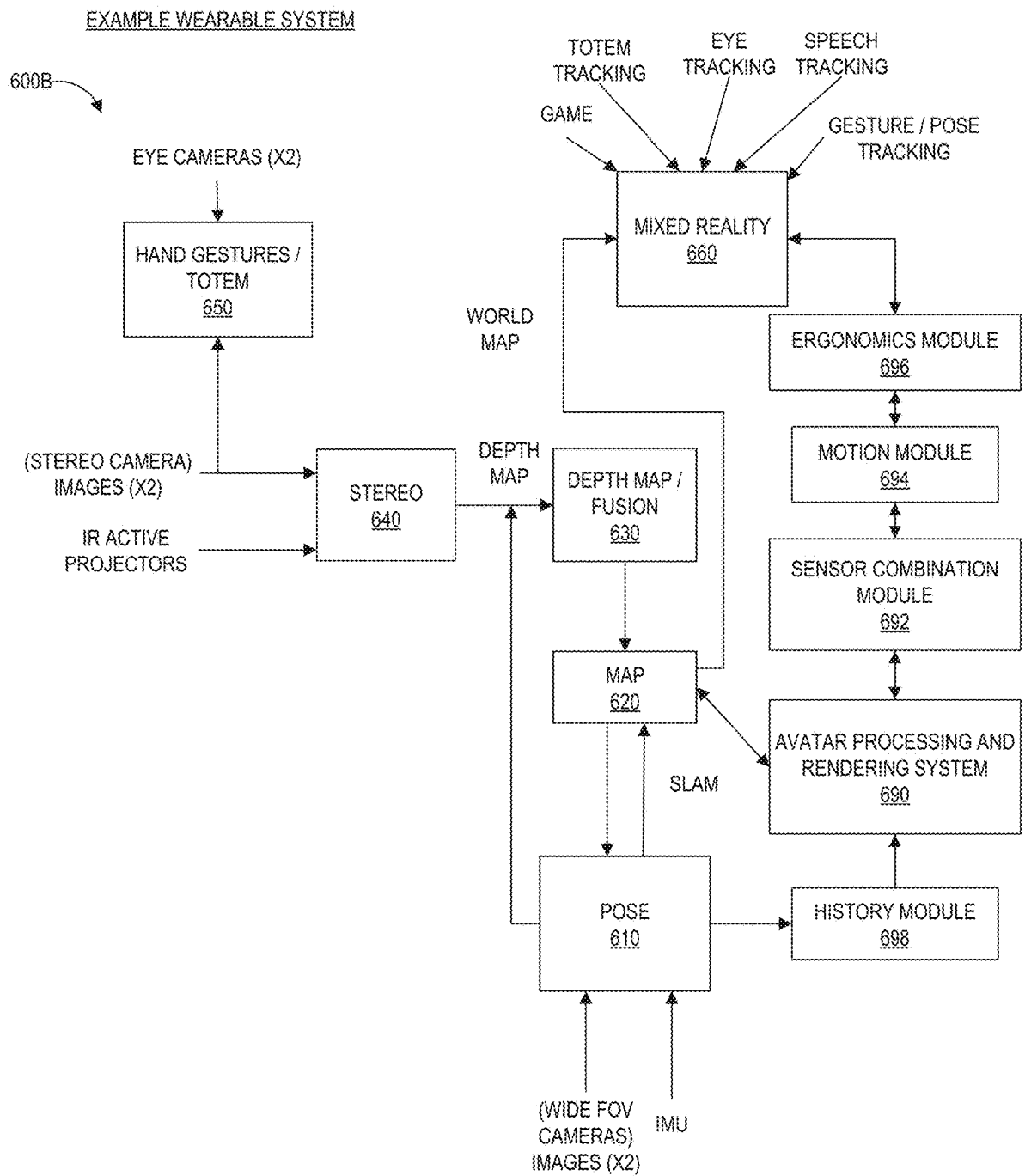
FIG. 6B is a block diagram of an example wearable system.
Figure 6C:
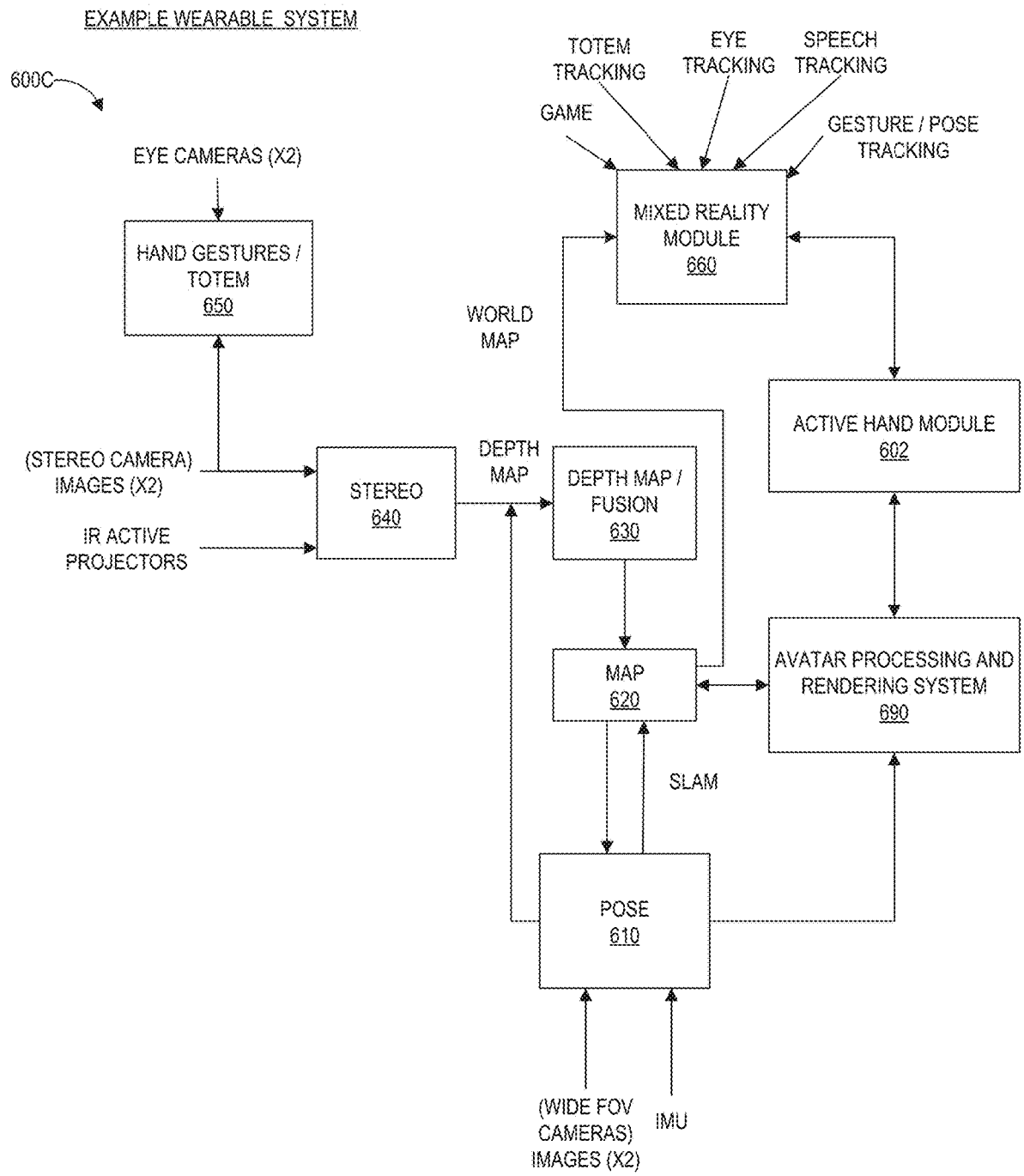
FIG. 6C is a block diagram of an example wearable system.

FIGS. 6A, 6B, and 6C are block diagrams of example wearable systems 600A, 600B, and 600C, which may also be referred to individually or collectively as the wearable system 600. Some or all of the components illustrated in the example wearable systems 600A, 600A (FIG. 6B), and/or 600C (FIG. 6C) may be part of the wearable system 200 shown in FIG. 2. Each of these wearable systems 600A, 600B, and 600C includes the components of system 600A, and the example systems 600B and 600C each include additional components, which are described in further detail below.

Figure 7:
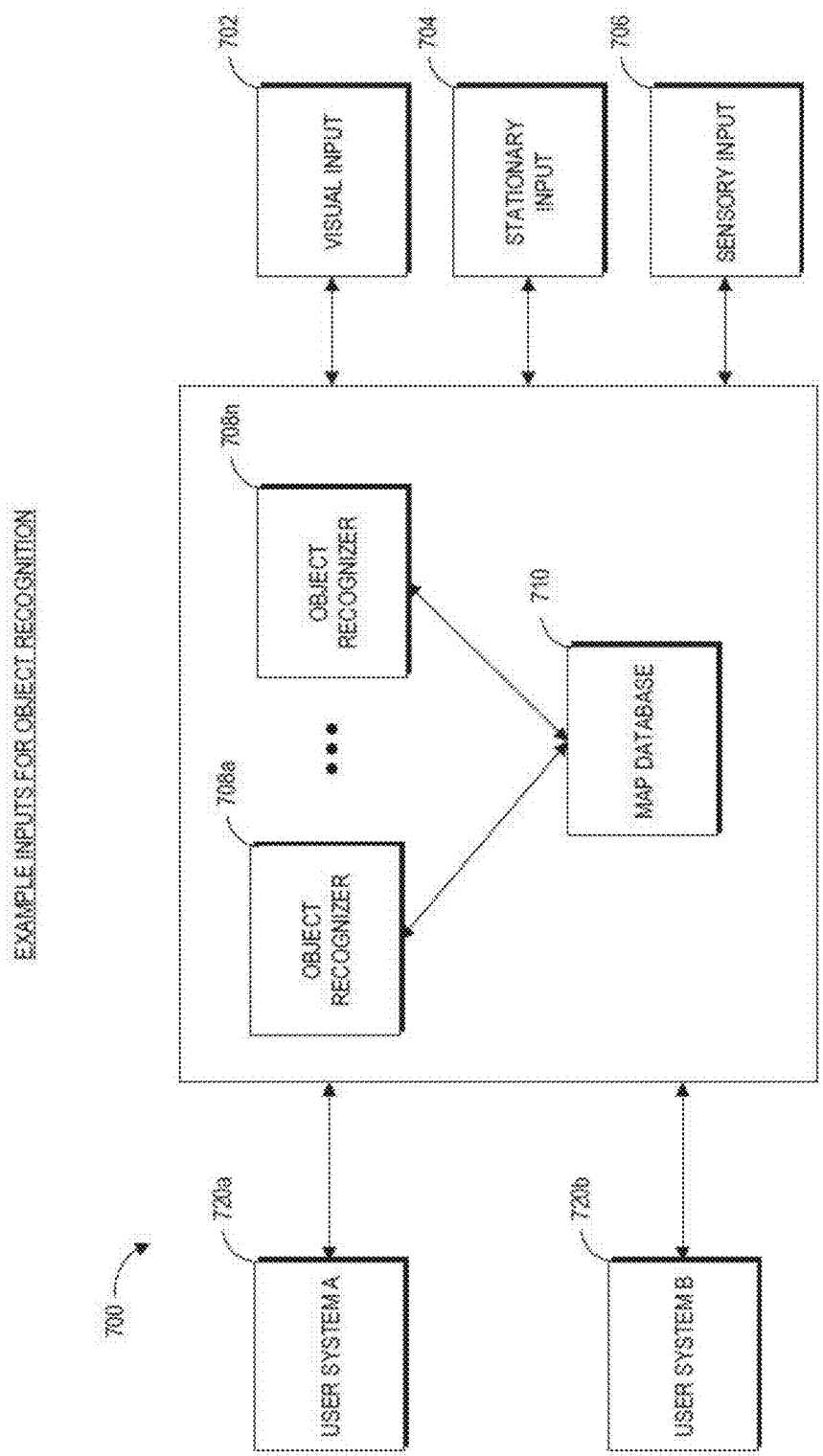
FIG. 7 is a block diagram of an example of a wearable system including various inputs into the wearable system.

In the examples of FIGS. 6A, 6B, and 6C, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware and/or user and/or totem. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map, using the data from the map, and/or determining how to animate an avatar corresponding to the user.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing.

In the example wearable systems 600, image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality module 660, various inputs may be utilized. For example, game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device, alternatively called a controller), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The wearable system 600 can include an audio sensor (e.g., a microphone) that receives an audio stream from the environment. The wearable system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 (FIG. 2) can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or via communication links 262, 264 to the remote processing module 270 and remote data repository, respectively, either alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

FIG. 6B is a block diagram of an example wearable system 600B, which may be part of the wearable system 200 shown in FIG. 2. In addition to the components of wearable system 600A, the wearable system 600B includes a motion module 694, ergonomics module 696, history module 698, and sensor combination module 962. In some embodiments, one or more of 692, 694, 696, and 698 may be combined in one or more of the components of the wearable system 600, such as by the avatar processing and rendering system 690 comprising modules 692, 694, 696 and/or 698.

Ergonomics module 696 may comprise ergonomics data related to a person's (e.g. the user's) hands and/or arms. In some embodiments, the ergonomics data may have a confidence level for each hand associated with a location (e.g. point) in 3D space. The ergonomics data may, in some embodiments, represent a heat map of the likelihood of the right hand being at a particular location in 3D space. Similarly, the ergonomics data may also comprise a heat map of the likelihood of the left hand being at a particular location in 3D space, where the hotter areas of the heat map indicate a higher confidence of the hand being at that location. In some embodiments, the location in 3D space may be relative to the user. In some embodiments, the location in 3D space may be relative to a world coordinate system as defined by the MR system. In some embodiments, the location in 3D space is a point, or an area, or a volume, within the 3D space (e.g. where the 3D space is the user's real world environment). For example, a heat map of the left hand would indicate that a point at arm's reach away directly to the left of the user has a high likelihood/confidence of being the left hand because the right hand cannot reach that far to the left because the right arm is not long enough to extend that distance. In contrast, however, a point directly in front of the user at eye level may have a 50% confidence level for both the right and left hands.

In some embodiments, ergonomics module 696 may comprise hand orientation data as well. In some embodiments, the orientation and position ergonomics data may be combined, but in other embodiments, the orientation and position ergonomics data may be separate data (e.g. a heat map for orientation, and a separate heat map for position). For example, the MR system may use one or more sensors, such as those described in FIG. 3 and FIG. 6, to identify the palm of the user's hand at a point six inches directly in front of the user's left shoulder. The heat map may indicate that there is an 80% likelihood that the hand is the right hand and only a 20% chance the hand is the left hand, based on human ergonomics.

Motion module 694 may comprise velocity and/or acceleration data of the user's hand and/or of the totem (or other hand held controller/device). The velocity data may be used to determine if the totem changed from one user's hand to the other user's hand.

Sensor combination module 692 may function to combine two or more sensor's data and associated confidence levels to determine a single prediction of which hand is the active hand and an associated confidence level.

History module 698 may comprise historical data such as past location, position, and/or confidence levels for one or both of the user's hands. In some embodiments, the historical data may be used to contextualize and/or error check the incoming sensor data.

Although sensor combination module 692, motion module 694, ergonomics module 696, and history module 698 are depicted in wearable system 600B at particular locations, the modules could be located at any other suitable location in example wearable system 600B. In some embodiments, modules 692-698 could be located and processed on a separate processor and the output fed into the wearable system 600B.

FIG. 6C is a block diagram of an example wearable system 600C, which may be part of the wearable system 200 shown in FIG. 2. In addition to the components of wearable system 600A, the wearable system 600C includes an active hand module 602, which may include one or more of the sensor combination module 692, motion module 694, ergonomics module 696, and history module 698 of wearable system 600B. In some embodiments, when two or more of the modules work together, they may function to determine the active hand (or hands) of the user, the location, and/or position of the active hand(s). In some embodiments, sensor combination module 692 may be located on processing modules 260 or 270.

Examples of Mapping a User's Environment

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466, etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for objects with certain characteristics. For example, the object recognizer 708a may be used to recognize faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
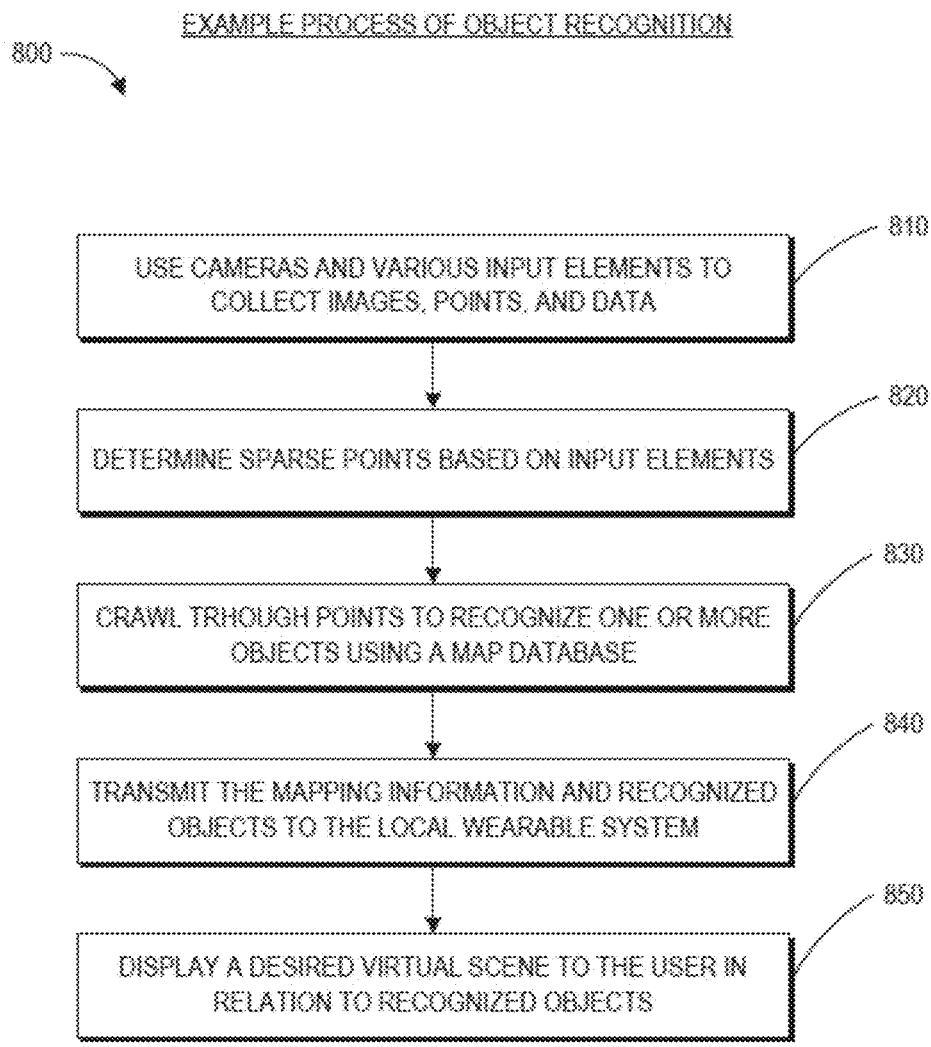
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications among Multiple Wearable Systems

Figure 9A:
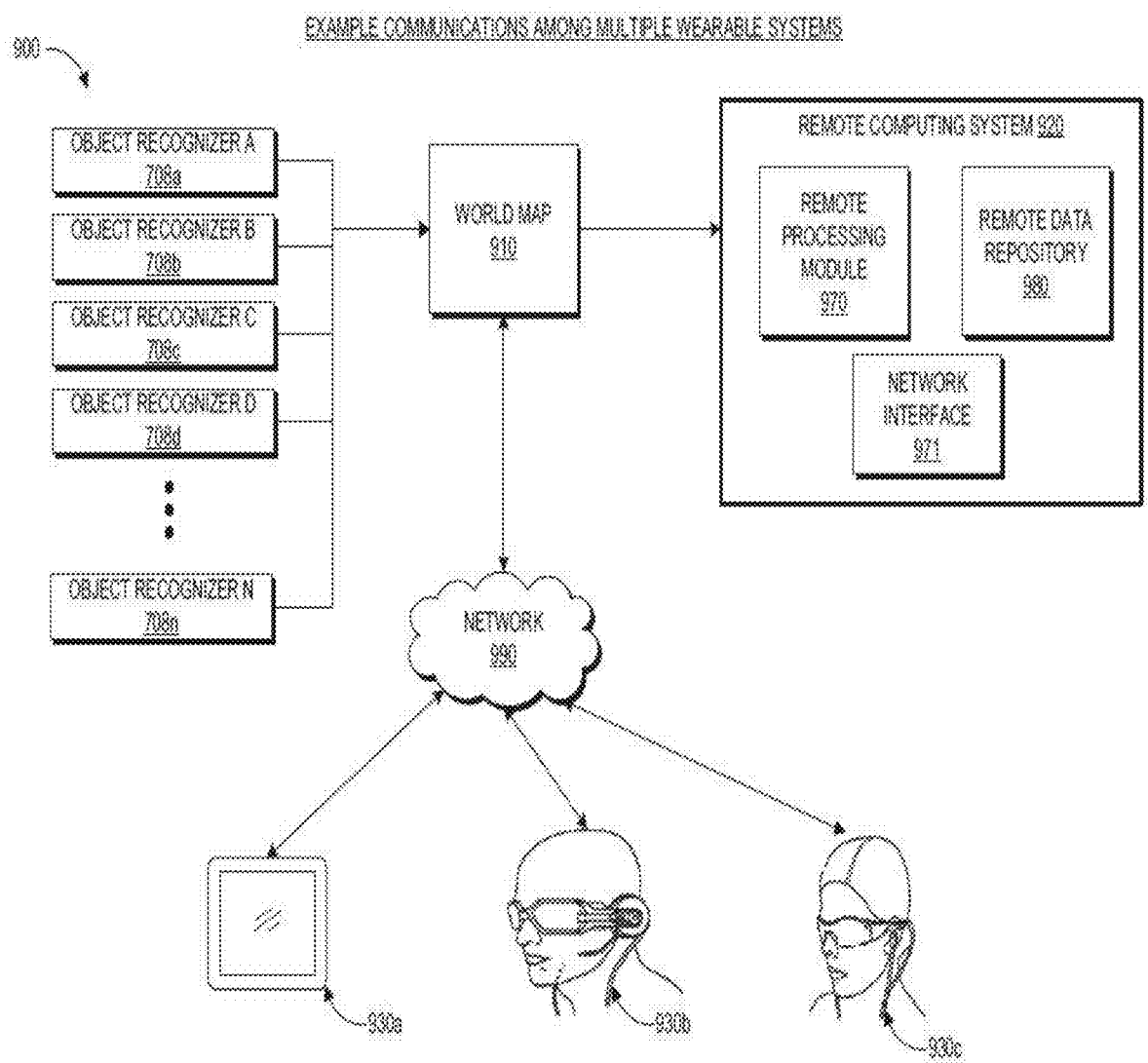
FIG. 9A schematically illustrates an overall system view depicting multiple wearable systems interacting with each other.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930*a*, 930*b*, 930*c*), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

Figure 9B:
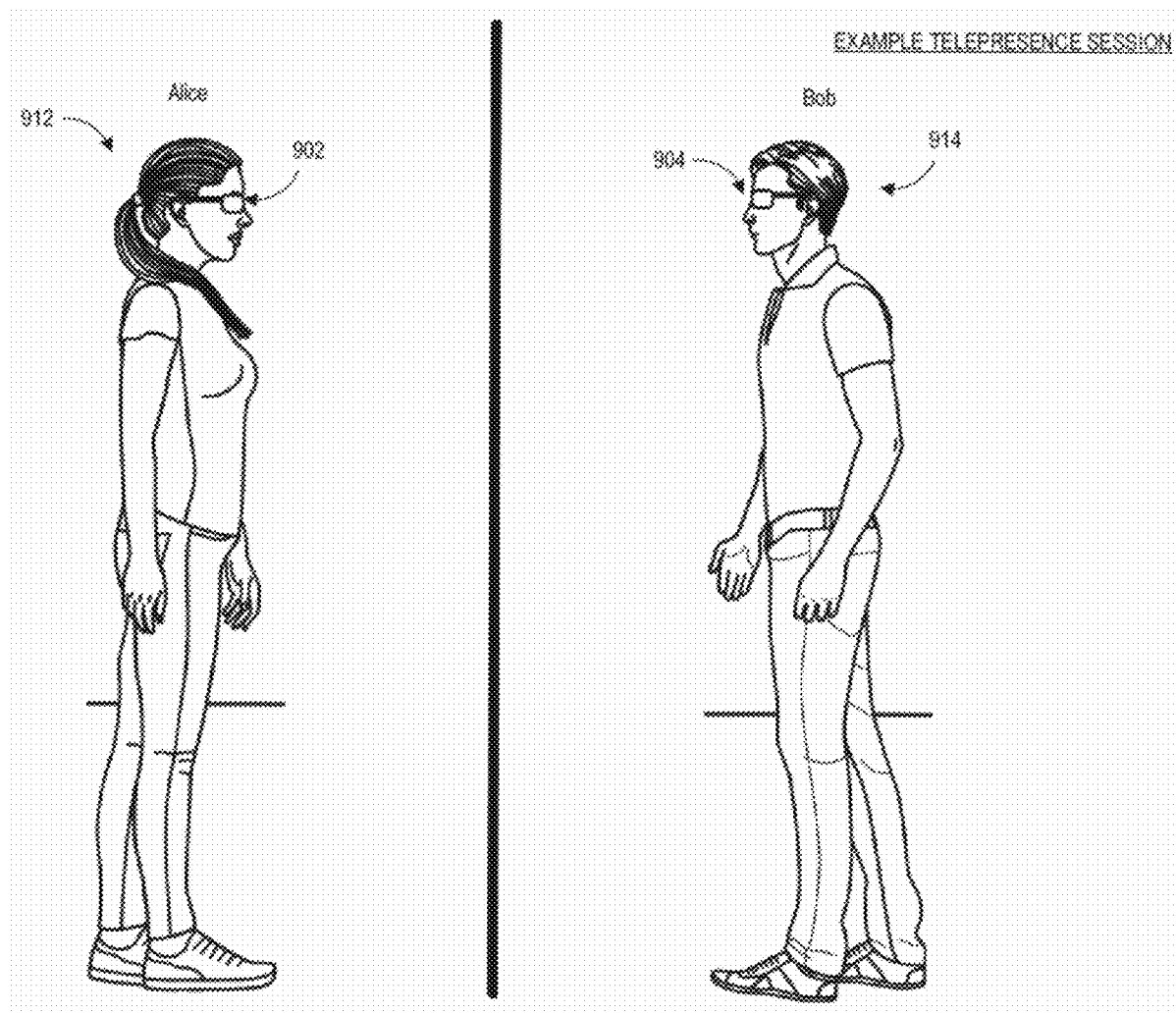
FIG. 9B illustrates an example telepresence session.

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice and Bob may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice may use other image acquisition and display devices such as a webcam and computer screen while Bob wears the wearable device 904.

Examples of a Virtual Avatar

Figure 10:
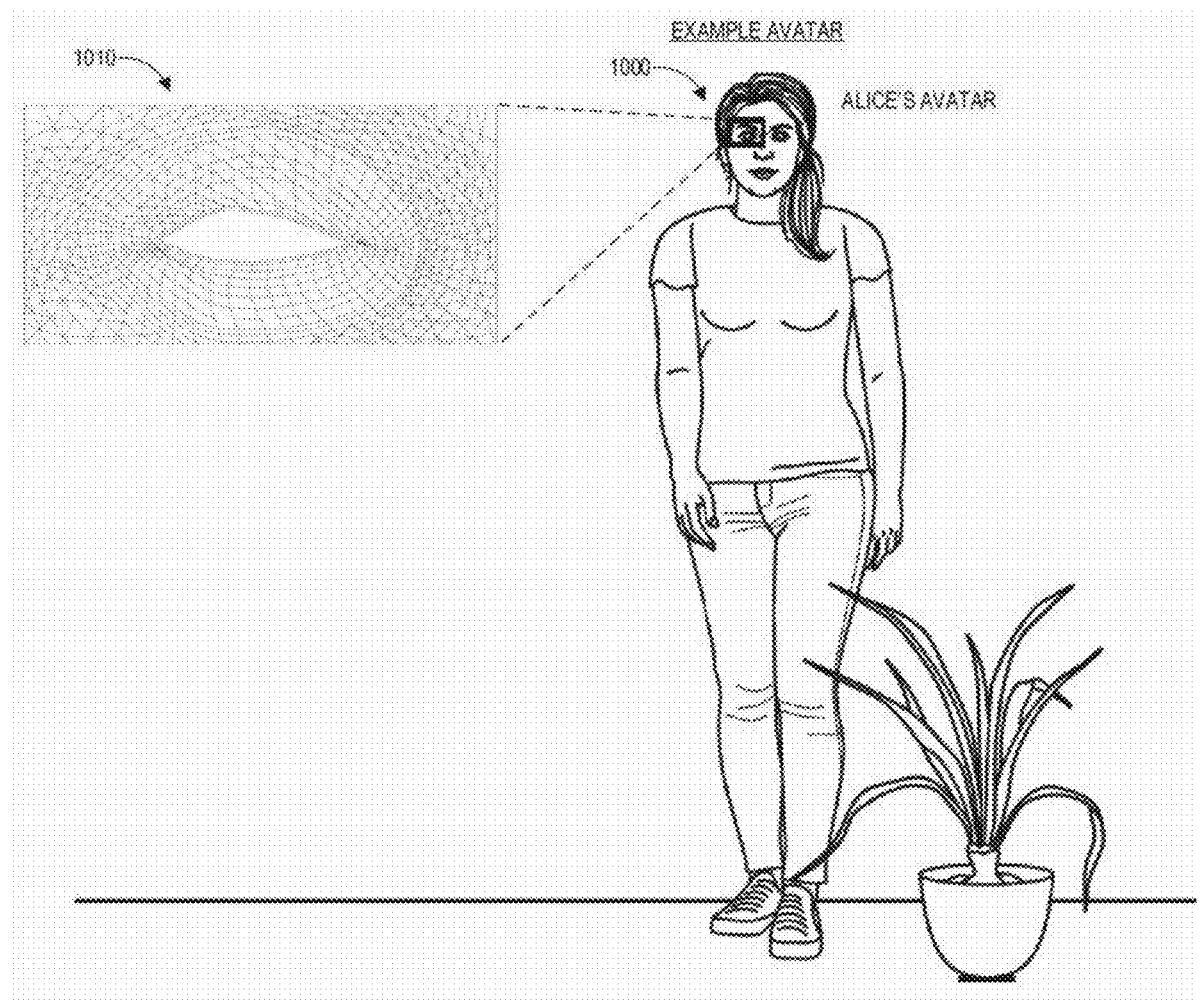
FIG. 10 illustrates an example of an avatar as perceived by a user of a wearable system.

FIG. 10 illustrates an example of an avatar as perceived by a user of a wearable system. The example avatar 1000 shown in FIG. 10 can be an avatar of Alice (shown in FIG. 9B) standing behind a physical plant in a room. An avatar can include various characteristics, such as for example, size, appearance (e.g., skin color, complexion, hair style, clothes, facial features (e.g., wrinkle, mole, blemish, pimple, dimple, etc.)), position, orientation, movement, pose, expression, etc. These characteristics may be based on the user associated with the avatar (e.g., the avatar 1000 of Alice may have some or all characteristics of the actual person Alice). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Example Control Systems for Animating an Avatar

An avatar can be animated by the wearable system using rigging techniques. A goal of rigging is to provide pleasing, high-fidelity deformations of an avatar based upon simple, human-understandable controls. Generally, the most appealing deformations are based at least partly on real-world samples (e.g., photogrammetric scans of real humans performing body movements, articulations, facial contortions, expressions, etc.) or art-directed development (which may be based on real-world sampling). Real-time control of avatars in a mixed reality environment can be provided by embodiments of the avatar processing and rendering system 690 described with reference to FIG. 6B.

Rigging includes techniques for transferring information about deformation of the body of an avatar (e.g., facial contortions) onto a mesh. A mesh can be a collection of 3D points (e.g., vertices) along with a set of polygons that share these vertices. FIG. 10 shows an example of a mesh 1010 around an eye of the avatar 1000. Animating a mesh includes deforming the mesh by moving some or all of the vertices to new positions in 3D space. These positions can be influenced by the position or orientation of the underlying bones of the rig (described below) or through user controls parameterized by time or other state information for animations such as facial expressions. The control system for these deformations of the mesh is often referred to as a rig. The example avatar processing and rendering system 690 of FIG. 6B includes a 3D model processing system 680, which can implement the rig.

Since moving each vertex independently to achieve a desired deformation may be quite time-consuming and effort-intensive, rigs typically provide common, desirable deformations as computerized commands that make it easier to control the mesh. For high-end visual effects productions such as movies, there may be sufficient production time for rigs to perform massive mathematical computations to achieve highly realistic animation effects. But for real-time applications (such as in mixed reality), deformation speed can be very advantageous and different rigging techniques may be used. Rigs often utilize deformations that rely on skeletal systems and/or blendshapes.

Example Skeletal Systems

Skeletal systems represent deformations as a collection of joints in a hierarchy. Joints (also called bones) primarily represent transformations in space including translation, rotation, and change in scale. Radius and length of the joint may be represented. The skeletal system is a hierarchy representing parent-child relationships among joints, e.g., the elbow joint is a child of the shoulder and the wrist is a child of the elbow joint. A child joint can transform relative to its parent's joint such that the child joint inherits the transformation of the parent. For example, moving the shoulder results in moving all the joints down to the tips of the fingers. Despite its name, a skeleton need not represent a real world skeleton but can describe the hierarchies used in the rig to control deformations of the mesh. For example, hair can be represented as a series of joints in a chain, skin motions due to an avatar's facial contortions (e.g., representing an avatar's expressions such as smiling, frowning, laughing, speaking, blinking, etc.) can be represented by a series of facial joints controlled by a facial rig, muscle deformation can be modeled by joints, and motion of clothing can be represented by a grid of joints.

Skeletal systems can include a low level (also referred to as low order in some situations) core skeleton that might resemble a biological skeleton of an avatar. This core skeleton may not map exactly to a real set of anatomically correct bones, but can resemble the real set of bones by having at least a sub-set of the bones in analogous orientations and locations. For example, a clavicle bone can be roughly parallel to the ground, roughly located between the neck and shoulder, but may not be the exact same length or position. Higher order joint structures representing muscles, clothing, hair, etc. can be layered on top of the low level skeleton. The rig may animate only the core skeleton, and the higher order joint structures can be driven algorithmically by rigging logic based upon the core skeleton's animation using, for example, skinning techniques (e.g. vertex weighting methods such as linear blend skinning (LBS)). Real-time rigging systems (such as the avatar processing and rendering system 690) may enforce limits on the number of joints that can be assigned to a given vertex (e.g., 8 or fewer) to provide for efficient, real-time processing by the 3D model processing system 680.

Blendshapes

Blendshapes include deformations of the mesh where some or all vertices are moved in 3D space by a desired amount based on a weight. Each vertex may have its own custom motion for a specific blendshape target, and moving the vertices simultaneously will generate the desired shape. Degrees of the blendshape can be applied by using blendshape weights. The rig may apply blendshapes in combination to achieve a desired deformation. For example, to produce a smile, the rig may apply blendshapes for lip corner pull, raising the upper lip, lowering the lower lip, moving the eyes, brows, nose, and dimples.

Example Rigging Techniques

A rig is often built in layers with lower, simpler layers driving higher order layers, which produce more realistic mesh deformations. The rig can implement both skeletal systems and blendshapes driven by rigging control logic. The control logic can include constraints among the joints (e.g., aim, orientation, and position constraints to provide specific movements or parent-child joint constraints); dynamics (e.g., for hair and clothing); pose-based deformations (PSDs, where the pose of the skeleton is used to drive a deformation based on distances from defined poses); machine learning techniques (e.g., those described with reference to FIG. 7) in which a desired higher level output (e.g., a facial expression) is learned from a set of lower level inputs (of the skeletal system or blendshapes); etc. Some machine learning techniques can utilize radial basis functions (RBFs).

In some embodiments, the 3D model processing system 680 animates an avatar in the mixed reality environment in real-time to be interactive (with users of the MR system) and to provide appropriate, contextual avatar behavior (e.g., intent-based behavior) in the user's environment. The system 680 may drive a layered avatar control system comprising a core skeletal hierarchy, which further drives a system of expressions, constraints, transforms (e.g., movement of vertices in 3D space such as translation, rotation, scaling, shear), etc. that control higher level deformations of the avatar (e.g., blendshapes, correctives) to produce a desired movement and expression of the avatar.

Example Process for Determining an MR User's Active Hand and Orientation

Figure 11A:
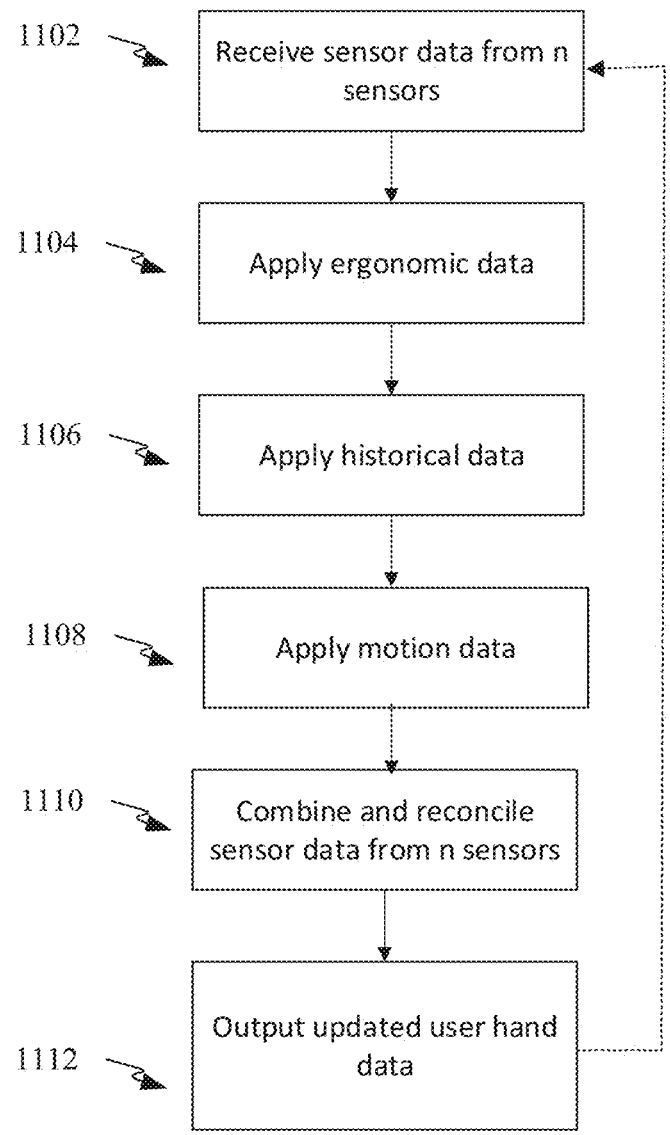
FIGS. 11A-11B illustrate example processes for determining a user's active hand(s), active hand(s)'s location(s), active hand(s)'s orientation(s), and/or the associated confidence level(s).

FIG. 11A illustrates an example process 1100a for determining a user's active hand(s), active hand(s) location(s), active hand(s) orientation(s), and/or the associated confidence level(s). At block 1102, a data processing module, such as active hand module 602 or processing modules 260 or 270, may receive sensor data from one or more sensors, for example n sensors, where n may be 2, 3, or 12 sensors. In some embodiments, the sensors may be one or more of the sensors described in FIGS. 2, 3, 6A-C, such as vision sensors (e.g. gray scale vision cameras, color vision cameras, etc.) and depth sensors. In some embodiments, the sensor data may be raw data. In some embodiments, the sensor data may comprise sensor data already comprising an initial confidence level associated with the data. In some embodiments, sensor data may comprise data for one or both of the user's hands and/or may comprise data for one or more totems. The totems may be used as an approximate location for the user's hand(s) since the totem is typically held in the user's hand. In some embodiments, a location offset calculation may be applied to the totem location to account for the user's hand being above the totem, while gripping the totem.

At block 1104, ergonomic data may be applied to the received sensor data. In some embodiments, this may mean that a set of rules or code representing ergonomic constraints of the user (or other generic human) may modify the received sensor data. In some embodiments, the modifications may comprise an initial or updated estimate of one or more of the following: which of the user's hands are the active hand, which hand is associated with which received sensor data, the orientation of one or both of the user's hands, the location of one or both of the user's hands, and a confidence associated with one or more of the components (or a single confidence for the entire estimate).

Ergonomic data may represent the likelihood of the right hand being at a particular location in 3D space (e.g. in the environment around the user). Ergonomic data may comprise any data related to a person's (e.g. the user's) hands and/or arms. In some embodiments, the ergonomic data may have a confidence level for each hand associated with a location (e.g. point) in 3D space. The ergonomic data may, in some embodiments, represent a heat map of the likelihood of the right hand being at a particular location in 3D space.

Similarly, the ergonomic data may also comprise a heat map of the likelihood of the left hand being at a particular location in 3D space, where the hotter areas of the heat map indicate a higher confidence of the hand being at that location. In some embodiments, the location in 3D space may be relative to the user. In some embodiments, the location in 3D space may be relative to a world coordinate system as defined by the MR system. In some embodiments, the location in 3D space is a point, or an area, or a volume, within the 3D space (e.g. where the 3D space is the user's real world environment). For example, a heat map of the left hand would indicate that a point at arm's reach away directly to the left of the user has a high likelihood/confidence of being the left hand because the right hand cannot reach that far to the left because the right arm is not long enough to extend that distance. In contrast, however, a point directly in front of the user at eye level may have a 50% confidence level for both the right and left hands.

In some embodiments, the ergonomics data applied in block 1104 may comprise hand orientation data as well. In some embodiments, the orientation and ergonomic data may be combined, but in other embodiments, the orientation and ergonomic data may be separate data (e.g. a heat map for orientation, and a separate heat map for position). For example, the MR system may use one or more sensors, such as those described in FIG. 3 and FIG. 6, to identify the palm of the user's hand at a point six inches directly in front of the user's left shoulder. The heat map may indicate that there is an 80% likelihood that the hand is the right hand and only a 20% chance the hand is the left hand, based on human ergonomics. In some embodiments, a point left while close to the body is more easily done with the right hand, and a point left while far from the body is more easily done with the left hand.

In some embodiments, the ergonomic data may represent how the user's hand has an area/volume around the user's body where the hand is more likely to be found. While it is possible, for example, to reach around and scratch the right ear with the left hand, a person is more likely to do said scratching with their right hand. In some embodiments, the ergonomic data may represent a single cone for each of the user's hands (i.e. a cone for the right hand, a cone for the left hand), to represent the volume in which the user's hands are most likely to be located. The cone may begin at the user's elbow (if the user's arm is straight down against the user's side) and expand outward away from the user's body (e.g. in the z-direction).

In some embodiments, the area or volume representing where the user's hand is most likely to be may be more complex and could even include multiple zones with varying weights. For example, the highest weight may be used for the initial cone described above, but a wider cone surrounding the initial cone may be assigned a slightly lower weight, and all areas outside of either cone may be assigned a low weight. Alternate methods of defining the ergonomic zones may be used. In some embodiments, hand orientation data may also be considered. In some embodiments, the ergonomic data applied in block 1104 may be stored in avatar processing and rendering system 690 of FIG. 6A, ergonomics module 696 of FIG. 6B, or active hand module 602 of FIG. 6C.

In some embodiments, the output from block 1104 may be the sensor data with an initial, or updated if an initial estimate was already associated with the received sensor data from block 1102, estimate of which hand (left or right) is the active hand, the location of the hand, position of the hand, and/or confidence associated with these.

At block 1106, historical data may be applied to the output of block 1104. Historical data may comprise historical data such as past location, position, and/or confidence levels for one or both of the user's hands. In some embodiments, historical data may also comprise past data received from individual sensors. In some embodiments, the historical data may be used to contextualize and/or error check the incoming sensor data. For example, the system may determine an error if the totem or user's hand moves more than a threshold value between subsequent frame readings. If a frame is read every ¹⁄₆₀th of a second but the system calculated a movement of one meter between frames (when the threshold is 0.1 meter), for example, the system may assign a low confidence level with the location of the user's hand.

As another example, applying the historical data may mean comparing data between frames for a single sensor. If the position of the totem hasn't moved for a threshold number of frames, the system may determine that the totem has frozen, which may result in unreliable data, and the system may thus assign a low confidence level to that data. In some embodiments, applying historical data may mean checking the data for validity for determining handedness, position, orientation, and/or confidence level(s) associated with these. In some embodiments, the historical data applied in block 1106 may be stored in avatar processing and rendering system 690 of FIG. 6A, history module 698 of FIG. 6B, and/or active hand module 602 of FIG. 6C.

At block 1108, motion data may be applied to the output of block 1106. In some embodiments, this may mean that a set of rules or code representing motion of the user (or other generic human) or the totem, may modify the output from block 1104. For example, the motion data may comprise a rule that represents a user is unlikely to change which hand is holding a totem, if the user's hand is moving quickly. This may help determine which hand is the active hand (e.g. the hand that is holding the totem), if, for example, historical data shows the right hand is holding the totem, and the velocity is above a threshold speed (thus categorizing it as "fast"), then the active hand is still likely to be the right hand. This may be advantageous in situations where, for example, the system has a low confidence level of which hand is the active hand (i.e. handedness) for a single frame. Velocity (and/or other motion data) and/or historical data may be applied to the handedness estimate in order to more accurately estimate the active hand. In some embodiments, the motion data applied in block 1108 may be stored in avatar processing and rendering system 690 of FIG. 6A, motion module 694 of FIG. 6B, and/or active hand module 602 of FIG. 6C.

In some embodiments, blocks 1104, 1106, and 1108 may be in a different order. For example, historical data may be applied 1108 first, then ergonomic data may be applied 1104, then motion data may be applied 1108. Other orders may be suitable.

At block 1110, the n outputs of the preceding blocks (e.g., one per n number of sensors) may be combined into a single estimate of the user's active hand, location, orientation, and/or accuracy associated with these. Combining and reconciling the estimates may comprise one or more blocks. The one or more blocks may be a set of rules that compare the data to figure out which is the most reliable. Data reliability may change depending on where the FOVs of the n sensors are located relative to each other and where the data is captured relative to those FOVs. In some embodiments, the combined and reconciled sensor data from n sensors of block 1110 may be stored in avatar processing and rendering system 690 of FIG. 6A, sensor combination module 692 of FIG. 6B, and/or active hand module 602 of FIG. 6C.

Figure 12:
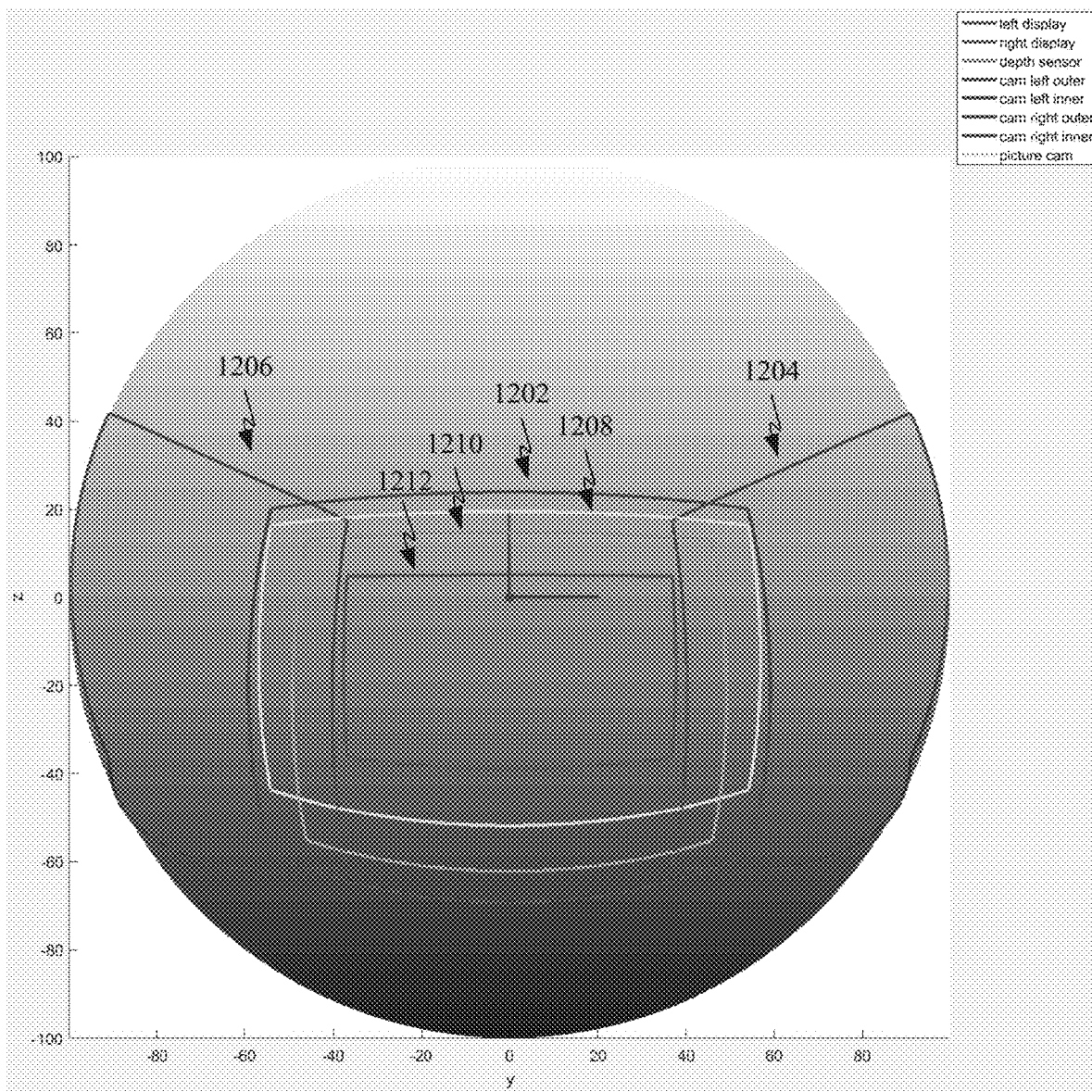
FIG. 12 illustrates an example set of FOVs for an example set of sensors.

FIG. 12 illustrates an example set of FOVs for an example set of sensors. In this example, there are eight sensors. 1202 may represent a first and second sensor combined FOV, such as a pair of left and right inward facing (inward as in facing towards each other) gray scale world (facing away from the user, towards the world) vision cameras, such as cameras 316 of FIGS. 3. 1204 and 1206 may represent outward facing right and left gray scale vision cameras that may be pointed away from each other in order to image a larger space around the user. 1208 may represent a color vision camera. 1210 may represent a depth sensor. 1212 may represent the FOV for the left and right displays of the MR device worn by the user. In some embodiments, more or fewer sensors may be used, such as 2, 3, or 10 sensors. In some embodiments, the same sensors may be used but in a different configurations relative to each other.

Figure 13:
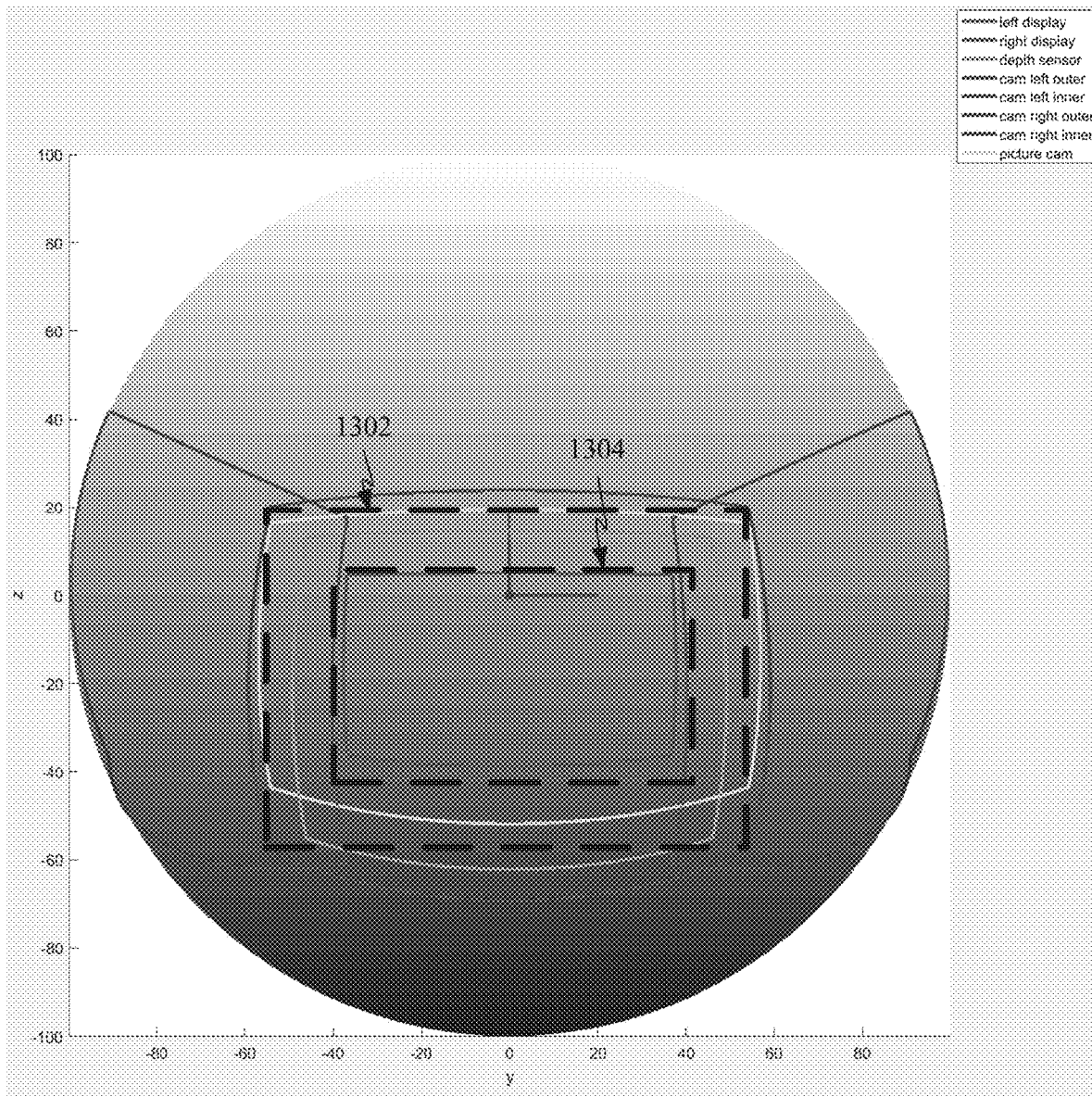
FIG. 13 illustrates an example set of regions for the set of sensors described in FIG. 12.

In some embodiments, regions may be defined based on the FOVs of the n sensors. The regions may change depending on the angle and distance of the sensors relative to each other. FIG. 13 illustrates an example set of regions for the set of sensors described in FIG. 12. In some embodiments, a region may be defined based on a sensor's central FOV vs. edge of the FOV. For example, 1302 may define essentially the entire FOV of the two inward facing world cameras. 1304 may define a boundary between a central region and an edge region for the pair of inward facing world cameras. The two boundaries 1302, 1304 may define a central area with increased gesture recognition capability and an edge area with decreased gesture recognition capability (since the gesture is on the edge, only a portion of the hand may be sensed by the sensor).

In some implementations, the regions may be used in block 1110 to help combine and reconcile sensor data from n sensors. For example, if one or two of the n sensors from process 1100a is gesture data (e.g. position of a hand at x, y, z) from the two inward facing world cameras, block 1110 may apply an operation to data captured in the region between 1302 and 1304, so the confidence level may be reduced (e.g. cut in half) compared to a similar gesture that would be detected in the central FOV inside boundary 1304. Additional rules may be used in block 1110 of process 1100a, and may function to: prioritize data from one sensor over conflicting data from a different sensor, calculate an updated confidence level based on combined sensor data (e.g. if a first sensor determines the active hand is the right hand with a confidence of 70%, and a second sensor determines the active hand is the right hand with a confidence of 75%, the combined confidence level may be >75%), determine data has an error, discard inaccurate data, prioritize data from a particular sensor depending on where in the sensor's FOV the data was captured, and more. The output from block 1110 may be a single estimate of which hand is the active hand, the active hand location, the active hand position, and/or a confidence level associated with each of these outputs. The estimate from block 1110 may be outputted for further use in block 1112.

At block 1112, the hand estimate may be output to the avatar processing and rendering system 690. The avatar processing and rendering system 690 may use the data from block 1112 to direct movements of a virtual avatar associated with the user, such as example avatar 1000. In some embodiments, the movement may be executed through the use of an avatar rigging system as described above, for example in context of FIG. 10. The hand estimate may be for the right hand, the left hand, or both depending on the data received by the sensors. In some embodiments, only a subset of the handedness (right vs. left hand), location, and/or orientation may be determined.

The process 1100a may repeat at every frame update of the system and/or sensors. For example, the sensors may be set to update at a certain time interval (e.g. every 1/60th of a second), at which point the process starts again at block 1102.

Figure 11B:
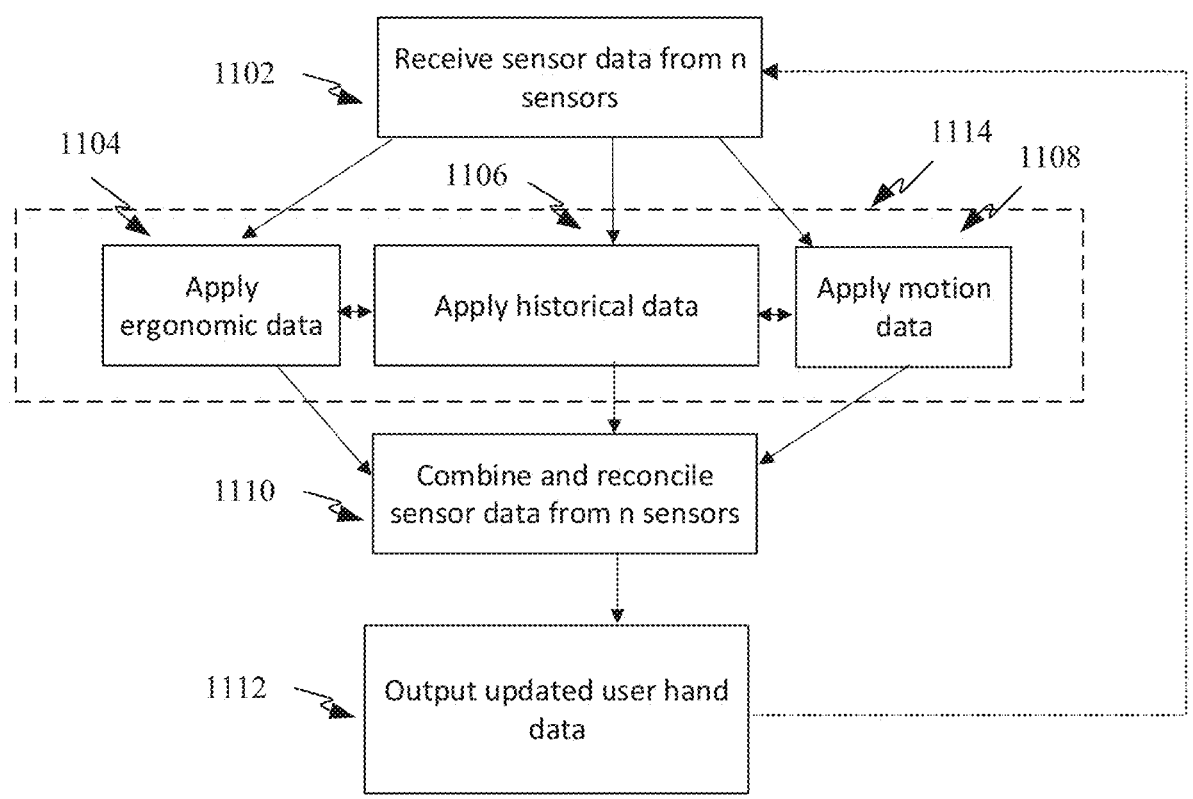

FIG. 11B illustrates an example process 1100b for determining a user's active hand(s), active hand's location(s), active hand's orientation(s), and/or the associated confidence level(s). Blocks of FIG. 11B may be analogous to FIG. 11A except for the order and quantity of the blocks 1104-1108. In process 1100b, blocks 1104-1108 of process 1100a may be combined together into a weighting block 1114 that determines the confidence levels associated with the n sensors. Thus, these blocks 1104-1108 may be performed concurrently or sequentially to share outputs with one another.

Block 1114 may comprise one or more methods of determining a confidence level for each of the n sensor data, for example including a user profile module (e.g. if the user's profile states the user is right handed, the system may default to assuming totem data represents the user's right hand), and/or an environmental module (e.g. the system may sense the user's environment to recognize a situation or context, such as riding a bike, where the user's hands are expected to be in a specific location and/or orientation, such as on the handlebars of the bike or on the oars of a boat).

Figure 14:
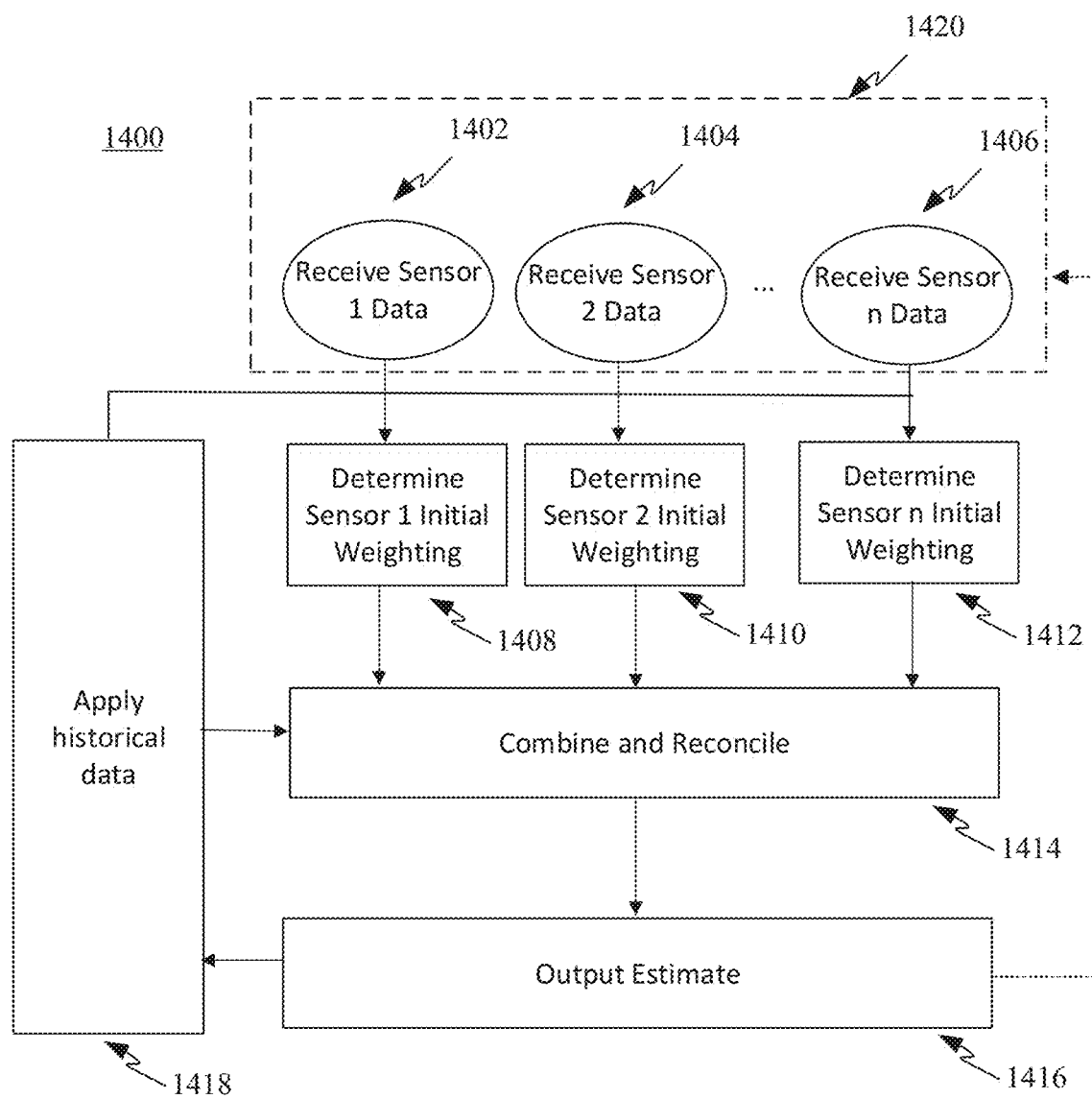
FIG. 14 illustrates an example process 1400 for determining a user's active hand(s), active hand's location(s), active hand's orientation(s), and/or the associated confidence level(s).

FIG. 14 illustrates an example process 1400 for determining a user's active hand(s), active hand's location(s), active hand's orientation(s), and/or the associated confidence level(s). In some embodiments, an ML system may be configured to detect one or two active hands of a user. In some embodiments, the process 1400 takes place in active hand module 602. In some embodiments, the process 1400 takes place on processing module 260 or 270.

The process 1400 starts at block 1420 where sensor data is received from n sensors. Block 1420 may comprise receiving Sensor 1 data at block 1402, receiving Sensor 2 data at block 1404, and receiving Sensor n data at block 1406. In some embodiments, sensor data is received from two or more sensors at block 1420. In some embodiments, the number of data streams received from sensors (or "sensor data streams") may change over time, so more or fewer sensors may be evaluated in process 1400 at any given point in time. Example sensors that may send data as part of process 1400 are one or more internal IMUs of a hand held controller (e.g. to get acceleration data for a totem), external tracking of a hand held controller (e.g. fiducials on the totem with a camera mounted on the MR headset to track the fiducials to obtain totem position in the real world), vision sensor (e.g. cameras, for gesture recognition), depth sensors (e.g. for object recognition), and the like.

In some embodiments, a depth sensor may be used to determine handedness via vision algorithms. Alternative sensors may be used to obtain raw position, orientation, and/or image data alone or in combination with the sensors disclosed herein. In some embodiments, the received sensor data may be raw data. Raw data may be data, such as acceleration data from an internal IMU, without an associated confidence level.

At blocks 1408, 1410, and 1412, the raw sensor data may be analyzed and an initial weighting (e.g. confidence level) may be determined. In some embodiments, the initial weightings may be based on historical data as described above. In some embodiments, the initial weightings 1408, 1410, and 1412 may be based on a set of rules based on system design, sensor design, and/or human ergonomics. For example, data from a totem may be less reliable the closer it is to the MR HMD. As a result, the system may be programmed to execute a programmed rule that decreases the confidence level of totem data when the totem position is within a threshold distance to the headset, such as within one foot. As another example, the system may be programmed to decrease the confidence level, or weighting, of data from a sensor that is inconsistently outputting the requested frames. For example, if Sensor 1 is periodically not outputting a requested frame, then there may be insufficient power for the sensor, which may decrease the accuracy of the sensor. In some embodiments, a sensor may output the same frame several times, and/or suddenly jump to a new frame after repeating a frame several times. If the number of times exceeds a threshold, then the system may determine that the sensor is frozen, possibly due to not enough power being supplied to the sensor or EM interference. Thus, the initial weighting blocks 1408, 1410, and 1412 may comprise a rule for discarding or disregarding the sensor data or adjusting (e.g., decreasing or increasing) the confidence level in that data. In some embodiments, the lack of data (e.g. a skipped frame) may be useful data, and may be utilized in a rule to determine a weighting. Various other rules for determining the reliability and accuracy of the received sensor data may be used.

In the example of FIG. 14, each received sensor data is associated with a weighting in block 1408, 1410, and/or 1412 but the weighting may be calculated differently based on the type of sensor. In some embodiments, an initial weighting for totem sensor data may be based in part on if the data appears frozen and at a trigger angle. The trigger angle may vary depending on the totem design, and may be 30 degrees for example. The totem data may appear frozen at a trigger angle because the totem was set down and the button on the bottom of the totem prevents the totem from laying flat, thus angling the resting device at a fixed trigger angle. In this situation, the initial weighting block associated with totem data may discard, disregard, or estimate an initial confidence of near 0% since the user's hand is not holding the totem.

In some embodiments, initial weighting blocks 1408, 1410, and/or 1412 may use a rule that applies a heat map of probabilities for the location of a totem based on its location in space. The rule may specify a high confidence level if the totem is within a right arm cone or left arm cone. In some embodiments, the arm cones may be defined as originating at a point where the user's elbow would be when the upper arm is straight down the user's side from shoulder to elbow, and the cone may extend outward from the user, in the z-direction. Additionally, if the orientation of the hand is taken into consideration, then the confidence level may increase even more, since it is possible for both the right hand and left hand to be at the same point in space at different times, but each hand would occupy that space with a different orientation due to physiological limitations of the human body. For example, the right hand may be oriented straight ahead while in the right cone, but the left hand at the same location within the right cone would be angled.

After an initial weighting is determined, the n streams of data from the n sensors are combined and reconciled at block 1414, based on one or more rules. In some embodiments, the reconcile sensor data from n sensors 1110 block (e.g., FIGS. 11A and 11B) and combine and reconcile block 1414 may be the same. In one example, a first rule may assess the incoming data streams from 1408-1412 to determine if the data is for the right hand, left hand, or both. The system may then apply the one or more rules until a single estimate for a first hand is determined, and optionally a single estimate for a second hand is determined. If data is received for only one hand, then only an estimate for one hand will be determined. For example, totem data may represent a single hand, but some gestures may represent both hands. Examples of wearable devices gesture recognition of the present disclosure are also described in U.S. Patent Publication No. 2015/0016777, which is incorporated by reference herein in its entirety.

In some embodiments, an example rule used at combine and reconcile block 1414 may be to compare the estimates from two or more sensors. If the estimates for handedness, orientation, and/or location agree, then block 1414 may calculate a new (e.g. higher) confidence level for that estimate. If the estimates from the various sensor streams do not match, the system may assess where the sensor data was taken. For example, within the visual region of the system (e.g. within the FOV of one or more vision sensors), then vision data should take precedence over data from other sensors. When outside of the visual region, totem data may instead take precedence. The set of rules for which sensor takes priority over other sensors in given regions may be based on the reliability of individual sensors, sensor configuration, and/or environmental conditions (e.g. depth sensors are more reliable in low light settings than vision sensors).

At block 1416, an estimate is output. In some embodiments, the output may be interpreted as, given the current and historical conditions, there is a xx % confidence level that there is a totem in the left hand with pose Q. The confidence levels may then be adjusted over time as new data updates are added to the system. The estimate may be for the right hand, the left hand, or both. The estimate may be for the location and/or orientation of one or both hands. The estimate may comprise a confidence level associated with the estimate. The process 1400 may repeat from block 1416 back to block 1420 when the sensors send a new frame. The process may repeat at a regular interval, such as at pre-programmed frame updates of 1/60th of a second, or may occur intermittently, such as event based, or may occur based on user input, such as from an avatar chat application. The output may be subsequently fed into an avatar processing and rendering system, such as 690 of FIGS. 6A-6C, and may drive the motion of an avatar associated with the user.

Figure 15:
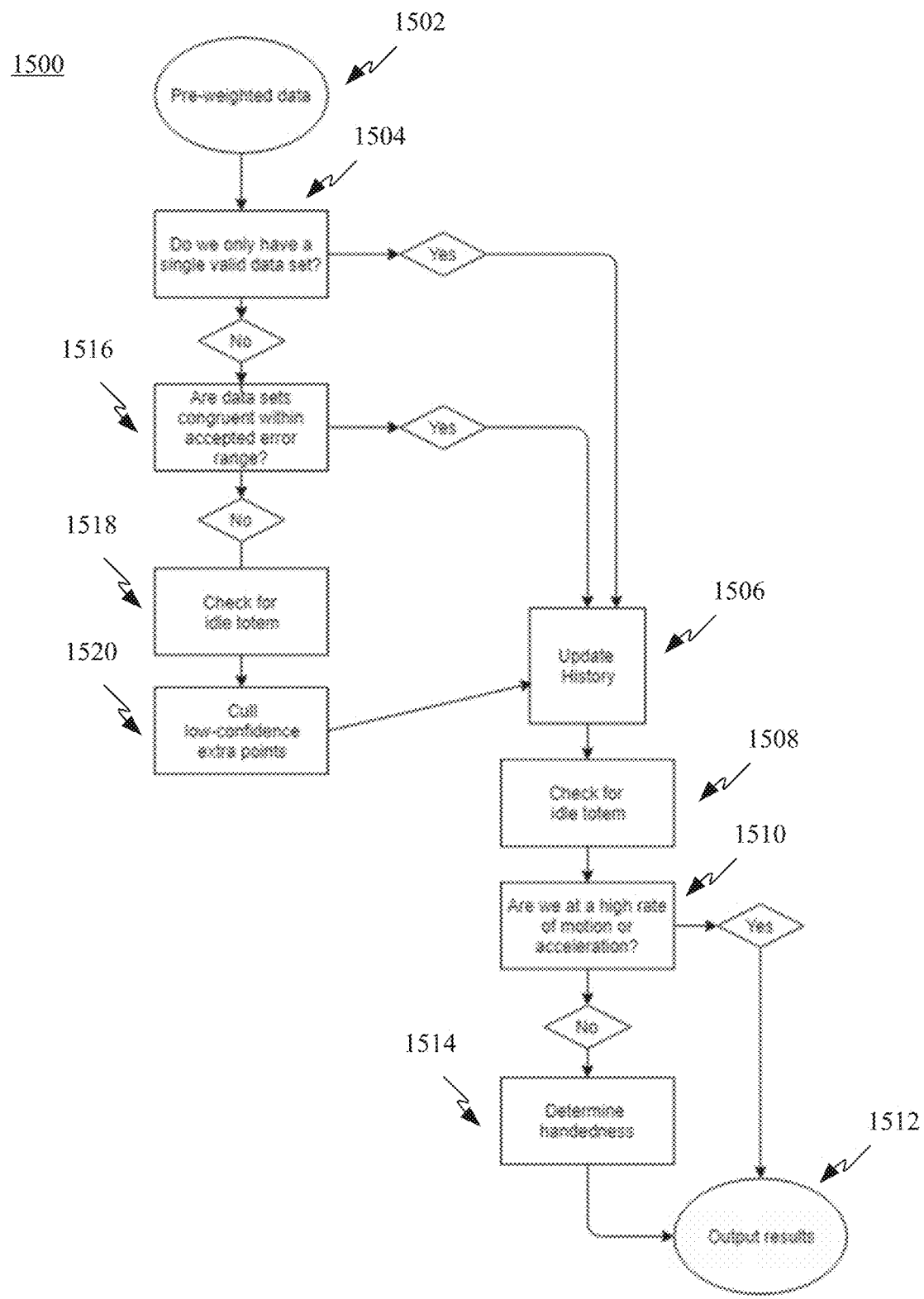
FIG. 15 illustrates an example process 1500 for combining and reconciling sensor data comprising an initial weighting to produce a single estimate across all sensor data.

FIG. 15 illustrates an example process 1500 for combining and reconciling sensor data comprising an initial weighting to produce a single estimate across all sensor data at a given frame (e.g. a set of readouts from a set of sensors at a given point in time). The combining and reconciling process 1414 (FIG. 14) may include some or all of the process 1500. Process 1500 starts at block 1502 where pre-weighted data is received. The pre-weighted data may be the data from blocks 1408-1412, for example.

At block 1504, the pre-weighted data is evaluated to determine if the pre-weighted data comprises only a single valid data set. In some embodiments, a single valid data set may comprise one estimate for the right hand, one estimate for the left hand, or one estimate for each hand. In some embodiments, a single valid data set may comprise one data stream for the right hand, one data stream for the left hand, or one data stream for each hand.

If the pre-weighted data comprises a valid data set, then the process proceeds to block 1506 where the history is updated. The history may comprise history data comprising data on past frame outputs from sensors used to evaluate handedness, location, and/or orientation of the user's hand (e.g. hand tracking). In some embodiments, the history also comprises past output results from previous frame updates. The history may be stored in the history module 698, the avatar processing and rendering system 690, and/or the active hand module 602. Alternatively, the history data may be stored at various locations throughout a system, such as system 200. For example, historical data for the sensors may be stored in the sensor itself, or may be stored in a processor associated with each sensor that may comprise sensor management processes and data.

At block 1508, the process 1500 determines if the totem is in an idle totem state utilizing one or more idle totem rules. The idle totem rules may be a rule as described above, for example, checking to see if a threshold number of previous frames from a given sensor are the same. In some embodiments, an idle totem may be determined by checking the state of the totem and categorizing the totem as idle if the totem is turned off or in a sleep mode. In some embodiments, an idle totem may be a totem that has repeated frame outputs for a threshold number of frames, in combination with a trigger angle, such as 30 degrees from horizontal. In some embodiments, an idle state may represent when the user sets the totem down, puts the totem in the user's pocket, dangles the totem from the user's wrist, or other situations in which the totem is providing data but the totem is not actually in the user's hand. For example, an idle state may be determined based on a rule that analyzes the sensor data for cyclic motion (e.g. access history data) that may represent the totem swinging from the user's wrist. In some embodiments, if an idle state is determined, the data may be tagged as an idle state and the avatar rendering system may decide to render differently. For example, the avatar rendering system may not render the updated output results, or the avatar rendering system may choose to instead display an idle state sequence that may provide for a more realistic avatar. For example, it is unnatural for a person to stand completely still for an extended period. Even if a person isn't moving, there may be small shifts in pose. In some embodiments, an idle state sequence may display instead of a swinging motion of the hand if the totem was dangling from the user's wrist. In some embodiments, only high confidence idle motions will be determined. In some embodiments, an idle state determination may be determined so the updated output won't be displayed since the avatar is not doing anything interesting or useful. For example, it may be preferable to just show one hand doing something than one hand and an idle hand. In some embodiments, idle totem data may not be available from the data streams, and the process proceeds to block 1510.

At block 1510, the process 1500 determines if the data comprises a high rate of motion or acceleration. In some embodiments, motion may be velocity. Velocity may be calculated by accessing previous frame data and calculating a difference in distance from a first frame to a second frame, divided by the time lapse between frames. In some embodiments, motion may be angular velocity. In some embodiments, motion may be motion for a single point in space, for part of an object, for an entire object, for a Prism (e.g. bounding box) for an object, or any other suitable method of tracking. Acceleration may be determined based on IMU data, for example, from an IMU embedded in a totem or hand held controller. Other methods of determining velocity and/or acceleration may be used, depending on the data streams available. In some embodiments, velocity and/or acceleration data may not be available. The velocity and/or acceleration may be divided into categories defining a high, medium, and/or low rate. The categories may be based on the particular application. For example, categories for tracking a car would have higher velocities, than categories for tracking a snail.

If the motion and/or acceleration is at a high rate, then at block 1512, the results of process 1500 are output. The results may be an estimate. The estimate may comprise one or more of an active hand or hands (e.g. left and/or right hand), an orientation for the active hand, and/or a location for the active hand. In some embodiments, the output may be used to drive the motion for part of an avatar associated with the user's hands and/or arms. In some embodiments, the output is sent to avatar processing and rendering system 690. In some embodiments, the output is sent to data processing modules 260 and/or 270.

If the motion and/or acceleration is not at a high rate, then the process 1500 may proceed to block 1514. At block 1514, the handedness of the active hand may be determined. The handedness may be determined using one or more sets of rules. For example, velocity may be used as an input to a rule that determines the user did not switch the hand holding the totem if the velocity is above a threshold velocity. If the velocity is above a threshold velocity, and the incoming data to block 1514 already contains a handedness estimate, then the handedness estimate may be determined to be the same.

At block 1504, if the process 1500 comprises more than a single valid data set, the process proceeds to block 1516 where the multiple pre-weighted data streams are compared to each other to determine if they are consistent/congruent with each other, or if they are different. If the data sets are congruent, the process 1500 proceeds to block 1506. If the data sets/streams are not congruent, the process proceeds to block 1518. Block 1518 may be the same as block 1508. In some embodiments, block 1518 may only determine low confidence idle states. This may be the case because, after a block 1504 determination that there's more than a single data set, the objective of the process may be to cull the data down to a single estimate. Removing low confidence idle states may help narrow down the remaining data streams because a moving/active data set may be more interesting and/or relevant. In some embodiments, congruent data may comprise multiple (e.g. two) sets of data that each comprise a handedness estimate of the right hand as the active hand. In some embodiments, data that is not congruent may comprise multiple (e.g. two) sets of data where the first data set comprises a handedness estimate of the left hand, and the second data set comprises a handedness estimate of the right hand. In some embodiments, there are more than two sets of data. In some embodiments, all data sets must comprise the same handedness estimate to be considered congruent. In some embodiments, a threshold number of data sets must match in order to be considered congruent, for example, 5 out of 9 data sets must match.

At block 1520, if the data sets are not congruent (as determined at block 1516), the low confidence extra points are culled. In some embodiments, an extra point may be an extra data point, which may be more than one estimate for the right hand, more than one estimate for the left hand, or more than one estimate for both hands. The output from block 1520 may comprise, at most, a single data stream/estimate/data set for each hand. In some embodiments, a low-confidence extra point may be a second data set for a single hand that has a lower confidence level than the first data set. For example, a first estimate for the right hand may have a 90% confidence level, and a second estimate may have a 30% confidence level. The second data set may be removed from process 1500, may be moved to the history data, or may be used to update the confidence level for the first data set (e.g. going from 90% to 92%).

In some embodiments, confidence levels may be categorized into a high, medium, and/or low confidence category. Data sets that fall within the low confidence category may be culled at block 1520. In some embodiments, high confidence may be above 80%, medium confidence may be above 40 to 80% confidence, and low confidence may be below 40%. Other categories, such as having more or less than three categories, or different threshold values for those categories, may be used. The process may proceed to block 1506 after block 1520.

In some embodiments, the left hand side of the process (blocks 1502, 1504, 1516, 1518, and 1520 may function to narrow down data sets to a single estimate for the right hand, a single estimate for the left hand, or a single estimate for both hands. The right hand side of process 1500 (blocks 1506-1514) may be the part of the process after a likely left and/or right hand has been estimated. At this point the process 1500 re-evaluates the estimates because, even though an estimate has been made, there may be times when displaying the estimate after output at block 1512 doesn't make sense (e.g. the totem is frozen so we don't want the left hand of an avatar animating correctly while the right hand is oddly stationary or oddly swinging back and forth). Block 1512 may be the same as block 1416.

Advantageously, the methods and systems disclosed herein may comprise a set of rules that can evaluate the confidence values of the n sensor inputs so that motion and tracking of the user's hands can occur seamlessly as the user's hands move from regions best tracked by one method to different region best tracked by a different method (e.g. passive camera tracking/gesture recognition is best directly in front of the user, while internal motion sensors may provide equally precise data regardless of location). Handedness may be estimated using (e.g. depth) image estimates and gesture recognition, and 6DOF control information may be used to provide more accurate hand data beyond the field of view of the wearable display. The use of multiple sources of data also helps disambiguate uncertain hand estimates that would have occurred with only a single source of data. Within the field of view, the confidence of hand pose estimates may be increased due to multiple collaborating observations from multiple different sources.

Example Implementations

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example One: A computerized method, performed by a computing system having one or more hardware computer processors and one or more non-transitory computer readable storage devices storing software instructions executable by the computing system to perform the computerized method comprising: accessing a plurality of sensor data streams from a corresponding plurality of sensors of a mixed reality device, for each of the plurality of sensor data streams, determine a corresponding initial weighting for the sensor data stream, analyzing handedness information in the plurality of sensor data streams and corresponding initial weightings of the sensor data streams to determine an overall handedness, and providing the determined overall handedness to an application executing on the mixed reality device.

Example Two: The computerized method of Example One, wherein the overall handedness indicates either a left hand or a right hand.

Example Three: The computerized method of any of Examples One through Two, wherein the overall handedness further indicates a confidence level.

Example Four: The computerized method of any of Examples One through Three, wherein the confidence level is higher in response to matching handedness information in multiple sensor data streams.

Example Five: The computerized method of any of Examples One through Four, wherein the initial weightings are at least partially based on type of sensor.

Example Six: The computerized method of any of Examples One through Five, wherein the types of sensors include at least some of: a 6DOF external active tracking of a hand-held controller, a 6DOF internal motion tracking of the hand-held controller, or an external passive tracking of the hand-held controller.

Example Seven: The computerized method of Example Six, wherein the types of sensors further includes one or more of a vision sensor, a depth sensor, or a LIDAR sensor.

Example Eight: The computerized method of any of Examples One through Seven, wherein the initial weightings are at least partially based on quantity of recent data readings from the corresponding sensor.

Example Nine: The computerized method of any of Examples One through Eight, wherein the initial weightings are at least partially based on historical information associated with the corresponding sensor.

Example Ten: The computerized method of any of Examples One through Nine, wherein determining the initial weighting for a sensor data stream comprises: selecting, based on one or more characteristics of the corresponding sensor, one or more analysis rules, wherein the analysis rules are based on one or more of ergonomic data, historical data, or motion data associated with the sensor, and applying the selected one or more analysis rules to the sensor data stream to determine corresponding handedness information.

Example Eleven: The computerized method of Example Ten, wherein the one or more of the analysis rules: prioritizes a first sensor data stream from a first sensor over a second sensor data stream from a second sensor based on a determined higher reliability of the first sensor data stream compared to the second sensor data stream.

Example Twelve: The computerized method of any of Examples One through Eleven, wherein the one or more of the analysis rules prioritizes sensor data from a particular sensor depending on where in a field of view of the sensor the sensor data was captured.

Example Thirteen: The computerized method of Example Eleven, wherein the first sensor data stream is associated with a first confidence level that is higher than a second confidence level associated with the second data stream based at least on a position of the first sensor with reference to the wearable headset of the mixed reality device.

Example Fourteen: The computerized method of any of Examples Ten through Thirteen, wherein the one or more of the analysis rules identifies conflicts between the first sensor data stream and the second sensor data stream.

Example Fifteen: The computerized method of any of Examples Ten through Thirteen, wherein the one or more of the analysis rules periodically calculates an updated confidence level based on sensor data streams from two or more sensors.

Example Sixteen: The computerized method of any of Examples Ten through Thirteen, wherein the one or more of the analysis rules identifies errors in the sensor data streams and discards sensor data with errors.

Example Seventeen: The computerized method of Example Sixteen, wherein errors in a sensor data stream include missing frames, inconsistent frames, or duplicate frames in sensor data.

Example Eighteen: The computerized method of any of Examples One through Seventeen, further comprising: determining a field of view of each of the sensors, determining one or more field of view regions including at least a first region representing a central field of view, wherein at least two of the sensors provide sensor data associated with the first region.

Example Nineteen: The computerized method of Example Eighteen, wherein sensor data associated with the first region is associated with a higher confidence level than sensor data outside of the first region.

Example Twenty: A computing system comprising: a hardware computer processor, a non-transitory computer readable medium having software instructions stored thereon, the software instructions executable by the hardware computer processor to cause the computing system to perform operations comprising: accessing a plurality of sensor data streams from a corresponding plurality of sensors of a mixed reality device, for each of the plurality of sensor data streams, determine a corresponding initial weighting for the sensor data stream, analyzing handedness information in the plurality of sensor data streams and corresponding initial weightings of the sensor data streams to determine an overall handedness; and providing the determined overall handedness to an application executing on the mixed reality device.

Example Twenty-one: The computing system of Example Twenty, wherein the overall handedness indicates either a left hand or a right hand.

Example Twenty-two: The computing system of Example Twenty-one, wherein the overall handedness further indicates a confidence level.

Example Twenty-three: The computing system of Example Twenty-two, wherein the confidence level is higher in response to matching handedness information in multiple sensor data streams.

Example Twenty-four: The computing system of any of Examples Twenty through Twenty-three, wherein the initial weightings are at least partially based on type of sensor.

Example Twenty-five: The computing system of Example Twenty-four, wherein the types of sensors include at least some of: a 6DOF external active tracking of a hand-held controller, a 6DOF internal motion tracking of the hand-held controller, or an external passive tracking of the hand-held controller.

Example Twenty-six: The computing system of Example Twenty-five, wherein the types of sensors further includes one or more of a vision sensor, a depth sensor, or a LIDAR sensor.

Example Twenty-seven: The computing system of any of Examples Twenty through Twenty-six, wherein the initial weightings are at least partially based on quantity of recent data readings from the corresponding sensor.

Example Twenty-eight: The computing system of any of Examples Twenty through Twenty-seven, wherein the initial weightings are at least partially based on historical information associated with the corresponding sensor.

Example Twenty-nine: The computing system of any of Examples Twenty through Twenty-eight, wherein determining the initial weighting for a sensor data stream comprises: selecting, based on one or more characteristics of the corresponding sensor, one or more analysis rules, wherein the analysis rules are based on one or more of ergonomic data, historical data, or motion data associated with the sensor, and applying the selected one or more analysis rules to the sensor data stream to determine corresponding handedness information.

Example Thirty: The computing system of Example Twenty-nine, wherein the one or more of the analysis rules: prioritizes a first sensor data stream from a first sensor over a second sensor data stream from a second sensor based on a determined higher reliability of the first sensor data stream compared to the second sensor data stream.

Example Thirty-one: The computing system of Example Thirty, wherein the one or more of the analysis rules prioritizes sensor data from a particular sensor depending on where in a field of view of the sensor the sensor data was captured.

Example Thirty-two: The computing system of Example Thirty-one, wherein the first sensor data stream is associated with a first confidence level that is higher than a second confidence level associated with the second data stream based at least on a position of the first sensor with reference to the wearable headset of the mixed reality device.

Example Thirty-three: The computing system of any of Examples Thirty through Thirty-two, wherein the one or more of the analysis rules identifies conflicts between the first sensor data stream and the second sensor data stream.

Example Thirty-four: The computing system of any of Examples Thirty through Thirty-three, wherein the one or more of the analysis rules periodically calculates an updated confidence level based on sensor data streams from two or more sensors.

Example Thirty-five: The computing system of any of Examples Thirty through Thirty-four, wherein the one or more of the analysis rules identifies errors in the sensor data streams and discards sensor data with errors.

Example Thirty-six: The computing system of Example Thirty-five, wherein errors in a sensor data stream include missing frames, inconsistent frames, or duplicate frames in sensor data.

Example Thirty-seven: The computing system of Example Thirty-six, wherein the software instructions are further configured to cause the hardware computer processor to: determine a field of view of each of the sensors; and determine one or more field of view regions including at least a first region representing a central field of view, wherein at least two of the sensors provide sensor data associated with the first region.

Example Thirty-eight: The computing system of Example Thirty-seven, wherein sensor data associated with the first region is associated with a higher confidence level than sensor data outside of the first region.

Example Thirty-nine: A computing system comprising: a first sensor of a wearable system configured to acquire first user data usable to determine which of a left or right hand of a user is active, a second sensor of the wearable system configured to acquire second user data usable to determine which of the left hand or the right hand of the user is active, and a hardware processor in communication with the first and second sensors, the hardware processor programmed to: determine a first weighting for the first user data based on one or more of first historical data, first motion data, or first ergonomic data associated with the first user data, determine a second weighting for the second user data based on one or more of second historical data, second motion data, or second ergonomic data associated with the second user data, determine, based on the first user data, the first weighting, the second user data, and the second weighting, which of the left hand or right hand of the user is active; and output the determination to an avatar processing and rendering system.

Example Forty: The computing system of Example Thirty-nine, wherein the output is usable in determining movements of an avatar.

Example Forty-one: The computing system of any of Examples Thirty-nine through Forty, wherein the output is usable in determining movements of a hand of the avatar.

Example Forty-two: The computing system of any of Examples Thirty-nine through Forty-one, wherein the hardware processor is further programmed to: determine an orientation of the determined hand that is active.

Example Forty-three: The computing system of any of Examples Thirty-nine through Forty-two, wherein the ergonomic data indicates ergonomic constraints of users.

Example Forty-four: The computing system of Example Forty-three, wherein the ergonomic data includes a rule indicating a high confidence level of the left hand being active when a hand is detected in a first region and a low confidence level of the left hand being active when a hand is detected outside of the first region.

Example Forty-five: The computing system of Example Forty-four, wherein position of the hand with reference to the first region is determined based on one or both of the first user data and the second user data.

Example Forty-six: The computing system of any of Examples Forty-four through Forty-five, wherein the ergonomic data includes a rule indicating a high confidence level of the right hand being active when the hand is detected in a second region and a low confidence level of the right hand being active when the hand is detected outside of the second region.

Example Forty-seven: The computing system of any of Examples Thirty-nine through Forty-six, wherein the historical data indicates: one or more of a first past location or first past orientation of the left hand of the user, and one or more of a second past location or a second past orientation of the right hand of the user.

Example Forty-eight: The computing system of any of Examples Thirty-nine through Forty-seven, wherein the historical data indicates: one or more heat maps of probabilities that the left hand of the user is active based on location information of one or more sensors, and probabilities that the right hand of the user is active based on location information of one or more sensors.

Example Forty-nine: The computing system of Example Forty-seven, wherein the historical data further includes a confidence level.

Example Fifty: The computing system of any of Examples Thirty-nine through Forty-nine, wherein the motion data indicates: speed of movement of the corresponding sensor.

Example Fifty-one: The computing system of any of Examples Thirty-nine through Fifty, wherein the first weighting is determined by application of historical data first, motion data second, and ergonomic data third.

Example Fifty-two: The computing system of any of Examples Thirty-nine through Fifty-one, wherein the hardware processor is further programmed to: determine one or more of a location or an orientation of the left hand or right hand of the user that is determined to be active.

Example Fifty-three: The computing system of any of Examples Thirty-nine through Fifty-two, wherein the hardware processor is further programmed to: determine a first confidence level of the determined first weighting and a second confidence level of the determined second weighting.

Example Fifty-four: The computing system of any of Examples Thirty-nine through Fifty-three, wherein the processor is further programmed to: determine an overall confidence level of the determination of which of the left hand or right hand of the user is active.

Example Fifty-five: A computerized method, performed by a computing system having one or more hardware computer processors and one or more non-transitory computer readable storage device storing software instructions executable by the computing system to perform the computerized method comprising: acquiring first user data from a first sensor of a wearable system, the first user data usable to determine which of a left or right hand of a user is active, acquiring second user data from a second sensor of the wearable system, the second user data usable to determine which of the left hand or the right hand of the user is active; determining a first weighting for the first user data based on one or more of first historical data, first motion data, or first ergonomic data associated with the first user data, determine a second weighting for the second user data based on one or more of second historical data, second motion data, or second ergonomic data associated with the second user data, determine, based on the first user data, the first weighting, the second user data, and the second weighting, which of the left hand or right hand of the user is active; and output the determination to an avatar processing and rendering system.

Example Fifty-six: The computerized method of Example Fifty-five, wherein the output is usable in determining movements of an avatar.

Example Fifty-seven. The computerized method of any of Examples Fifty-five through Fifty-six, wherein the output is usable in determining movements of a hand of the avatar.

Example Fifty-eight. The computerized method of any of Examples Fifty-five through Fifty-seven, wherein the hardware processor is further programmed to: determine an orientation of the determined hand that is active.

Example Fifty-nine. The computerized method of any of Examples Fifty-five through Fifty-eight, wherein the ergonomic data indicates ergonomic constraints of users.

Example Sixty. The computerized method of any of Examples Fifty-nine through Sixty, wherein the ergonomic data includes a rule indicating a high confidence level of the left hand being active when a hand is detected in a first region and a low confidence level of the left hand being active when a hand is detected outside of the first region.

Example Sixty-one. The computerized method of Example Sixty, wherein position of the hand with reference to the first region is determined based on one or both of the first user data and the second user data.

Example Sixty-two. The computerized method of any of Examples Sixty through Sixty-one, wherein the ergonomic data includes a rule indicating a high confidence level of the right hand being active when the hand is detected in a second region and a low confidence level of the right hand being active when the hand is detected outside of the second region.

Example Sixty-three. The computerized method of any of Examples Fifty-five through Sixty-two, wherein the historical data indicates: one or more of a first past location or first past orientation of the left hand of the user, and one or more of a second past location or a second past orientation of the right hand of the user.

Example Sixty-four. The computerized method of any of Examples Fifty-five through Sixty-three, wherein the historical data indicates: one or more heat maps of probabilities that the left hand of the user is active based on location information of one or more sensors, and probabilities that the right hand of the user is active based on location information of one or more sensors.

Example Sixty-five. The computerized method of any of Examples Sixty-three through Sixty-four, wherein the historical data further includes a confidence level.

Example Sixty-six. The computerized method of any of Examples Fifty-five through Sixty-five, wherein the motion data indicates: speed of movement of the corresponding sensor.

Example Sixty-seven. The computerized method of any of Examples Fifty-five through Sixty-six, wherein the first weighting is determined by application of historical data first, motion data second, and ergonomic data third.

Example Sixty-eight. The computerized method of any of Examples Fifty-five through Sixty-seven, further comprising determining one or more of a location or an orientation of the left hand or right hand of the user that is determined to be active.

Example Sixty-nine. The computerized method of any of Examples Fifty-five through Sixty-eight, further comprising determining a first confidence level of the determined first weighting and a second confidence level of the determined second weighting.

Example Seventy. The computerized method of any of Examples Fifty-five through Sixty-nine, further comprising: determining an overall confidence level of the determination of which of the left hand or right hand of the user is active.

As noted above, implementations of the described examples provided above may include hardware, a method or process, and/or computer software on a computer-accessible medium.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A computerized method, performed by a computing system having one or more hardware computer processors and one or more non-transitory computer readable storage devices storing software instructions executable by the computing system to perform the computerized method comprising:
    accessing a plurality of sensor data streams from a corresponding plurality of sensors of a mixed reality device, the mixed reality device comprising a headset having a forward facing camera that provides a first sensor data stream and a handheld controller having an inertial motion sensor that provides a second sensor data stream;
    for each of the plurality of sensor data streams, including the first and second sensor data streams:
        determine an initial weighting for the sensor data stream based at least on a confidence level that the sensor data stream is usable to accurately predict an active hand of the user; and
        determine a handedness prediction based on analysis of the sensor data stream and the initial weighting, the handedness prediction identifying either a right hand or a left hand of the user as the predicted active hand and a confidence level that the handedness prediction is accurate;
    determining, based on the plurality of handedness predictions associated with the plurality of sensor data streams, an overall handedness prediction; and
    providing the determined overall handedness prediction to an application executing on the mixed reality device.

2. The computerized method of claim 1, wherein an overall confidence level is higher in response to matching handedness predictions from multiple sensor data streams.

3. The computerized method of claim 1, wherein the initial weightings are at least partially based on type of sensor.

4. The computerized method of claim 3, wherein the types of sensors include at least some of: a 6DOF external active tracking of a hand-held controller, a 6DOF internal motion tracking of the hand-held controller, or an external passive tracking of the hand-held controller.

5. The computerized method of claim 4, wherein the types of sensors further includes one or more of a vision sensor, a depth sensor, or a LIDAR sensor.

6. The computerized method of claim 1, wherein the initial weightings are at least partially based on quantity of recent data readings from the corresponding sensor.

7. The computerized method of claim 1, wherein the initial weightings are at least partially based on historical information associated with the corresponding sensor.

8. The computerized method of claim 1, wherein determining the initial weighting for a sensor data stream comprises:
   selecting, based on one or more characteristics of the corresponding sensor, one or more analysis rules, wherein the analysis rules are based on one or more of ergonomic data, historical data, or motion data associated with the sensor; and
   applying the selected one or more analysis rules to the sensor data stream to determine corresponding handedness information.

9. The computerized method of claim 8, wherein the one or more of the analysis rules:
   prioritizes a first sensor data stream from a first sensor over a second sensor data stream from a second sensor based on a determined higher reliability of the first sensor data stream compared to the second sensor data stream.

10. The computerized method of claim 8, wherein the one or more of the analysis rules prioritizes sensor data from a particular sensor depending on position of a detected hand of the user within a field of view of the mixed reality device.

11. The computerized method of claim 9, wherein the first sensor data stream is associated with a first confidence level that is higher than a second confidence level associated with the second data stream based at least on a position of the second sensor with reference to the headset of the mixed reality device.

12. The computerized method of claim 8, wherein the one or more of the analysis rules identifies conflicts between the first sensor data stream and the second sensor data stream.

13. The computerized method of claim 8, wherein the one or more of the analysis rules periodically calculates an updated confidence level based on sensor data streams from two or more sensors.

14. The computerized method of claim 8, wherein the one or more of the analysis rules identifies errors in the sensor data streams and discards sensor data with errors.

15. The computerized method of claim 14, wherein errors in a sensor data stream include missing frames, inconsistent frames, or duplicate frames in sensor data.

16. The computerized method of claim 1, further comprising:
   determining a field of view of each of the sensors;
   determining one or more field of view regions including at least a first region representing a central field of view, wherein at least two of the sensors provide sensor data associated with the first region.

17. The computerized method of claim 16, wherein sensor data associated with the first region is associated with a higher confidence level than sensor data outside of the first region.

18. A computing system comprising:
   a hardware computer processor;
   a non-transitory computer readable medium having software instructions stored thereon, the software instructions executable by the hardware computer processor to cause the computing system to perform operations comprising:
   accessing a plurality of sensor data streams from a corresponding plurality of sensors of a mixed reality device;
   for each of the plurality of sensor data streams, determine a corresponding initial weighting for the sensor data stream;
   determining a predicted handedness of the user indicating one or more of a left or right hand of the user that is predicted to be active, based on the sensor data streams and corresponding initial weightings of the sensor data streams; and
   providing the predicted handedness to an application executing on the mixed reality device.

19. A computing system comprising:
   a first sensor of a wearable system configured to acquire first user data usable to determine which of a left hand or a right hand of a user is active;
   a second sensor of the wearable system configured to acquire second user data usable to determine which of the left hand or the right hand of the user is active; and
   a hardware processor in communication with the first and second sensors, the hardware processor programmed to:
   determine a first weighting for the first user data based on one or more of first historical data, first motion data, or first ergonomic data associated with the first user data;
   determine a second weighting for the second user data based on one or more of second historical data, second motion data, or second ergonomic data associated with the second user data;
   determine, based on a first handedness estimate based on the first user data and the first weighting, and a second handedness estimate based on the second user data and the second weighting, which of the left hand or right hand of the user is active; and
   output the determination to an avatar processing and rendering system.

20. A computerized method, performed by a computing system having one or more hardware computer processors and one or more non-transitory computer readable storage device storing software instructions executable by the computing system to perform the computerized method comprising:
   acquiring first user data from a first sensor of a wearable system, the first user data usable to determine which of a left hand or a right hand of a user is active;
   acquiring second user data from a second sensor of the wearable system, the second user data usable to determine which of the left hand or the right hand of the user is active;
   determining a first weighting for the first user data based on one or more of first historical data, first motion data, or first ergonomic data associated with the first user data;
   determining a second weighting for the second user data based on one or more of second historical data, second motion data, or second ergonomic data associated with the second user data;
   determining, based on a first handedness estimate based on the first user data and the first weighting, and a second handedness estimate based on the second user data and the second weighting, which of the left hand or right hand of the user is active; and
   outputting the determination to an avatar processing and rendering system.

* * * * *